(12) United States Patent
Sasaki et al.

(10) Patent No.: US 6,940,689 B2
(45) Date of Patent: Sep. 6, 2005

(54) THIN-FILM MAGNETIC HEAD COMPRISING A FIRST POLE LAYER HAVING MULTIPLE LAYERS INCLUDING A SECOND LAYER AND A THIN-FILM COIL HAVING A PORTION DISPOSED BETWEEN THE SECOND LAYER AND A COUPLING PORTION AND METHOD OF MANUFACTURING THE THIN-FILM MAGNETIC HEAD

(75) Inventors: Yoshitaka Sasaki, Milpitas, CA (US); Hiroyuki Itoh, Milpitas, CA (US); Takehiro Kamigama, Hong Kong (CN)

(73) Assignees: Headway Technologies, Inc., Milpitas, CA (US); SAE Magnetics (H.K.), Ltd, Hong Kong (CN)

( * ) Notice: Subject to any disclaimer, the term of this patent is extended or adjusted under 35 U.S.C. 154(b) by 133 days.

(21) Appl. No.: 10/463,401

(22) Filed: Jun. 18, 2003

(65) Prior Publication Data

US 2004/0257700 A1 Dec. 23, 2004

(51) Int. Cl.⁷ .............................. G11B 5/17; G11B 5/31
(52) U.S. Cl. ...................................... 360/123; 360/126
(58) Field of Search ................................ 360/317, 119, 360/123, 126

(56) References Cited

U.S. PATENT DOCUMENTS

| 6,043,959 | A | 3/2000 | Crue et al. | 360/317 |
| 6,191,916 | B1 | 2/2001 | Sasaki | 360/126 |
| 6,259,583 | B1 | 7/2001 | Fontana, Jr. et al. | 360/126 |
| 6,525,905 | B1 * | 2/2003 | Sasaki | 360/126 |
| 6,553,649 | B1 * | 4/2003 | Santini | 29/603.14 |
| 6,577,475 | B1 * | 6/2003 | Sasaki et al. | 360/317 |
| 6,721,138 | B1 * | 4/2004 | Chen et al. | 360/317 |
| 6,724,572 | B1 * | 4/2004 | Stoev et al. | 360/126 |
| 6,768,611 | B2 * | 7/2004 | Sato et al. | 360/126 |
| 6,791,795 | B2 * | 9/2004 | Ohtomo et al. | 360/126 |
| 6,801,393 | B2 * | 10/2004 | Oki et al. | 360/126 |

FOREIGN PATENT DOCUMENTS

JP   A 11-283215   10/1999

* cited by examiner

Primary Examiner—Jefferson Evans
(74) Attorney, Agent, or Firm—Oliff & Berridge, PLC

(57) ABSTRACT

A thin-film magnetic head comprises a medium facing surface, a bottom pole layer, a top pole layer, a coupling portion, a recording gap layer, and a thin-film coil. The coupling portion is disposed away from the medium facing surface and couples the bottom pole layer to the top pole layer. The recording gap layer is disposed between the pole portion of the bottom pole layer and the pole portion of the top pole layer. The bottom pole layer incorporates: a first layer disposed to face toward the thin-film coil; a second layer, a third layer and a fourth layer that are disposed near the medium facing surface; and a coupling layer disposed away from the medium facing surface and coupling the bottom pole layer to the top pole layer. The thin-film coil incorporates a first coil having turns part of which are disposed between the second layer and the coupling layer; a second coil having turns at least part of which are disposed between turns of the first coil; and a connecting layer disposed on a side of the third layer and connecting the first coil to the second coil in series.

29 Claims, 23 Drawing Sheets

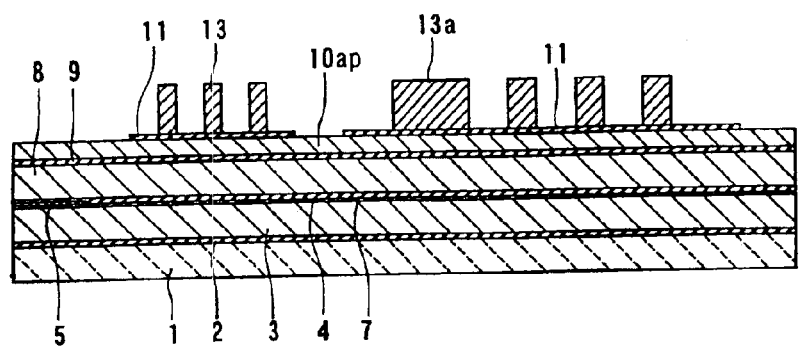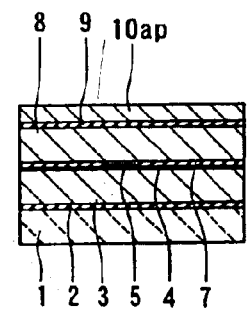
FIG. 1A　　　　　　　FIG. 1B
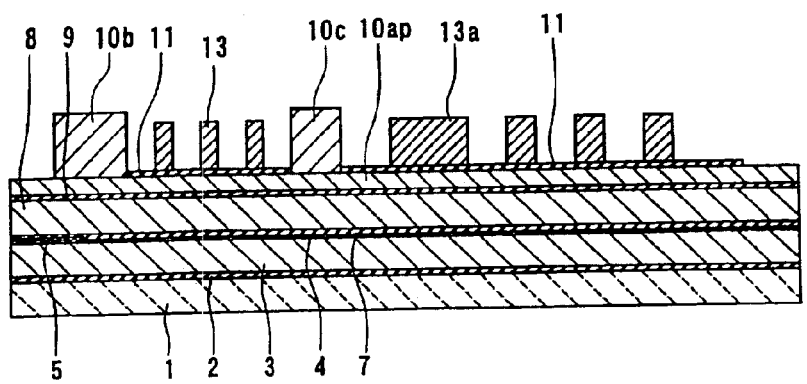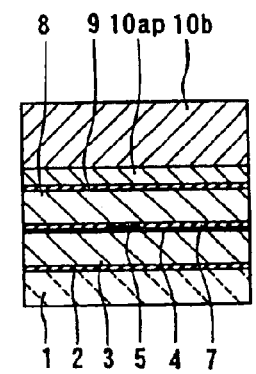
FIG. 2A　　　　　　　FIG. 2B

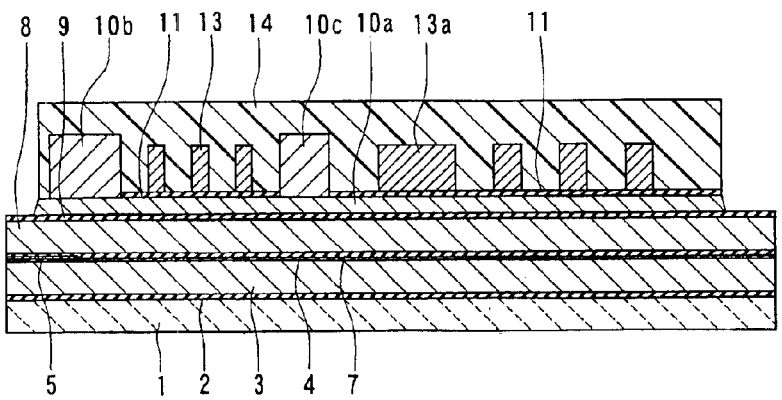 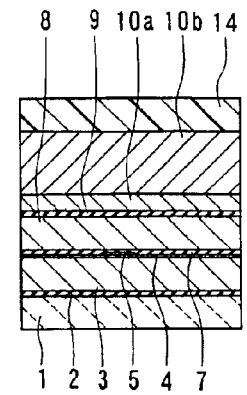
FIG. 3A  FIG. 3B
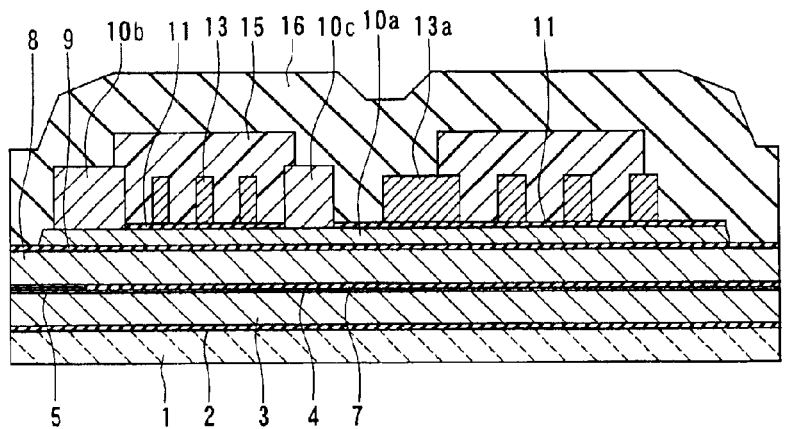 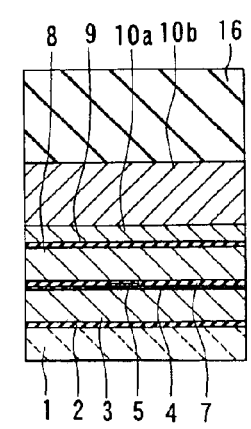
FIG. 4A  FIG. 4B

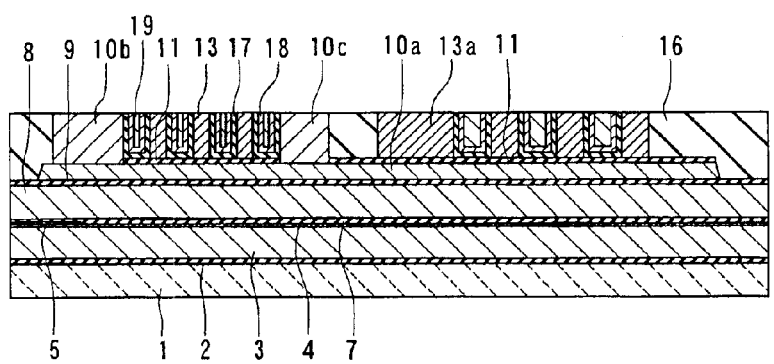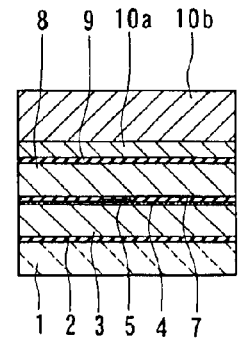
FIG. 7A FIG. 7B
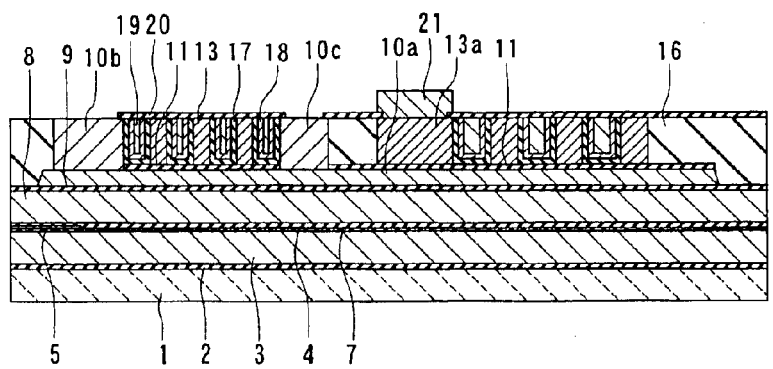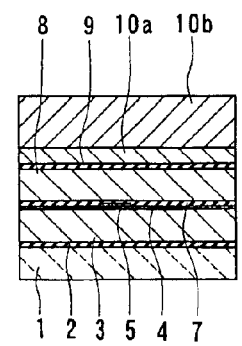
FIG. 8A FIG. 8B

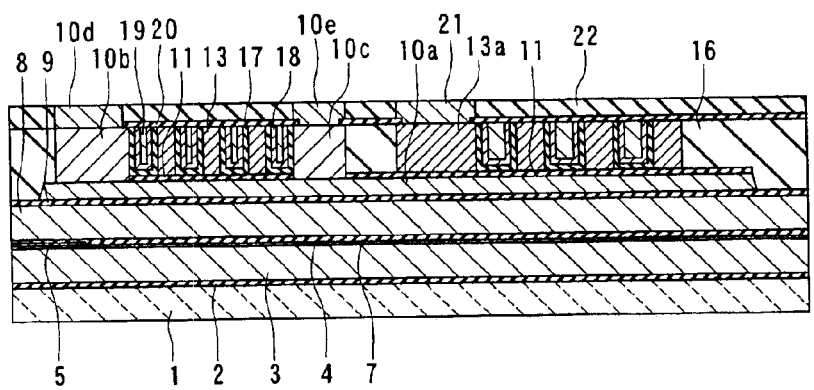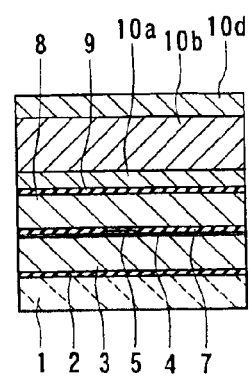
FIG. 9A   FIG. 9B
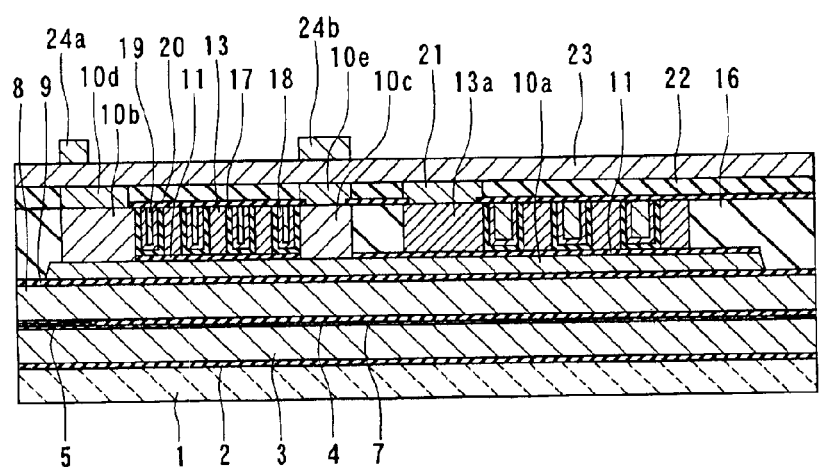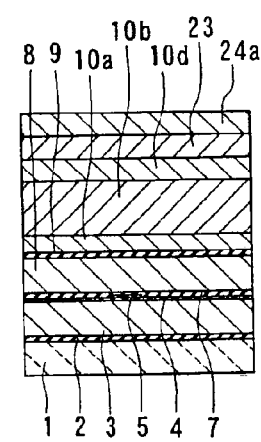
FIG. 10A   FIG. 10B

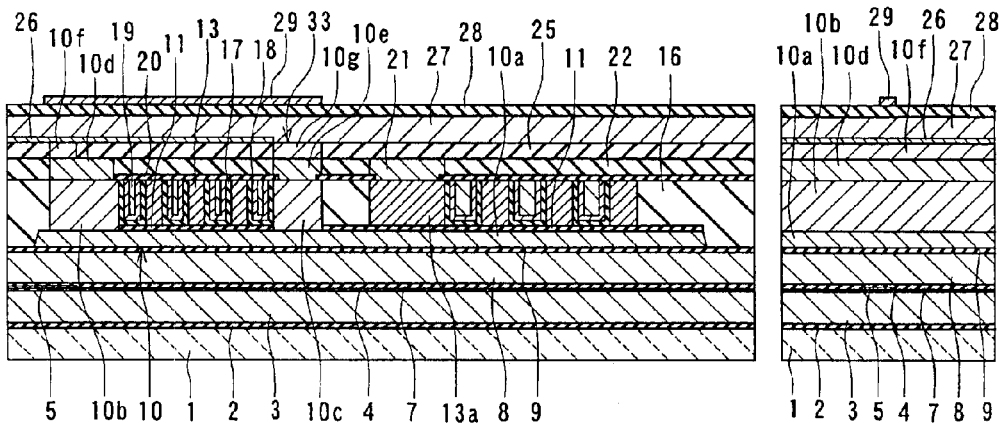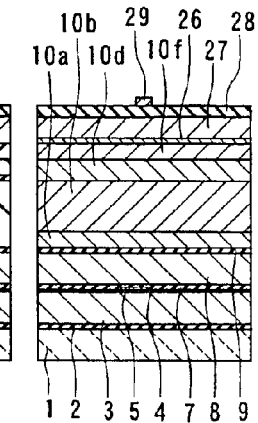
FIG. 13A    FIG. 13B
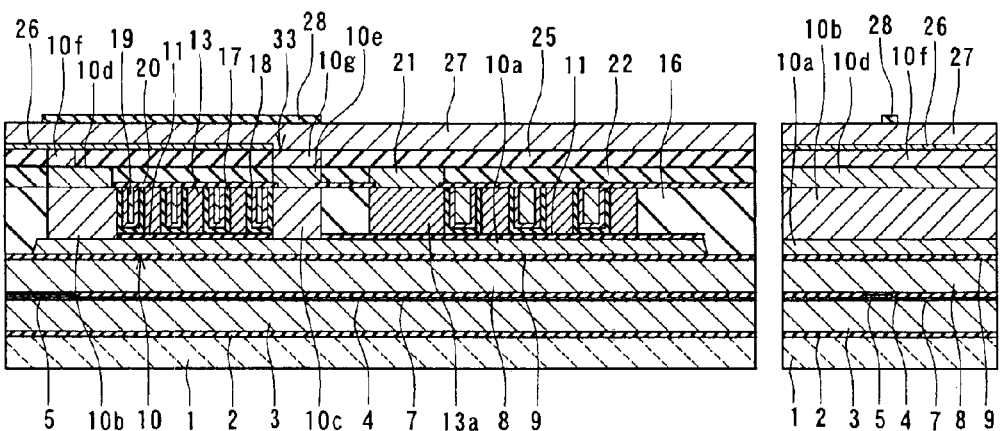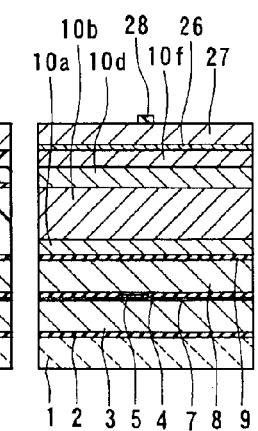
FIG. 14A    FIG. 14B

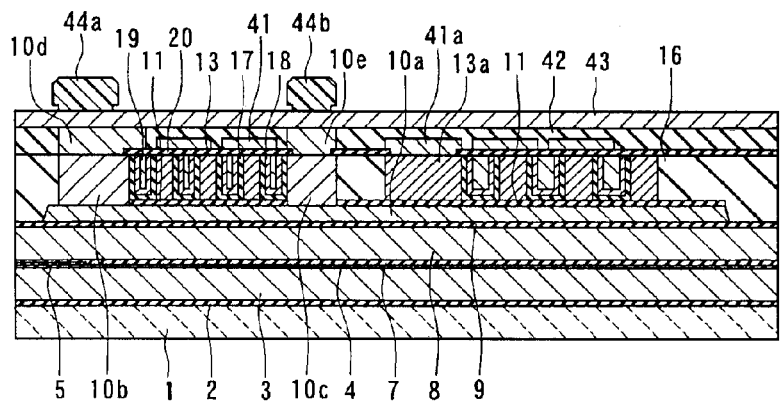 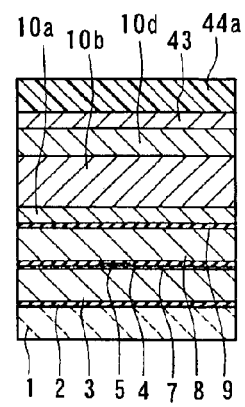
FIG. 22A  FIG. 22B
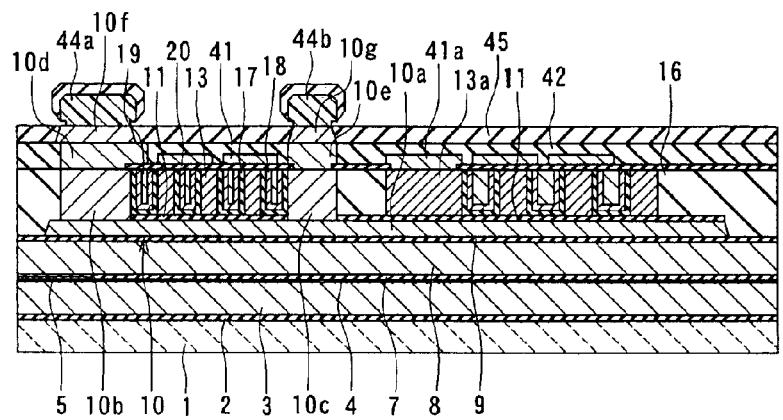 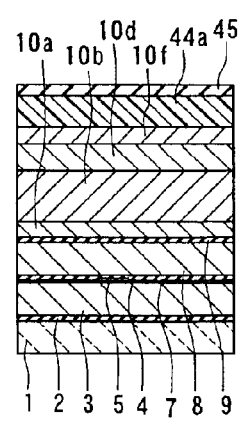
FIG. 23A  FIG. 23B

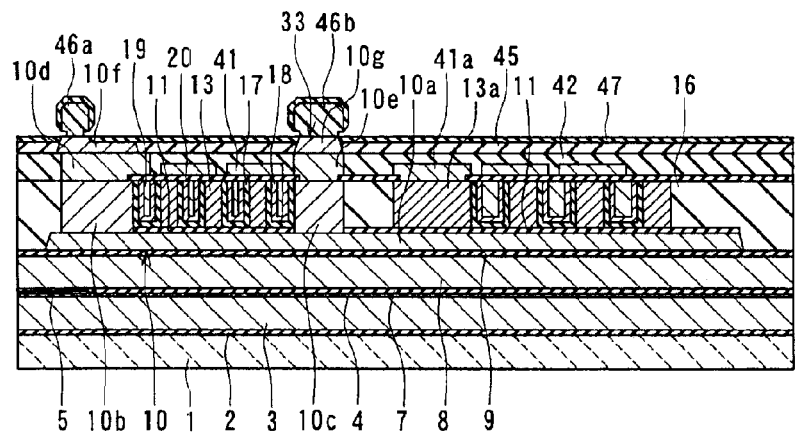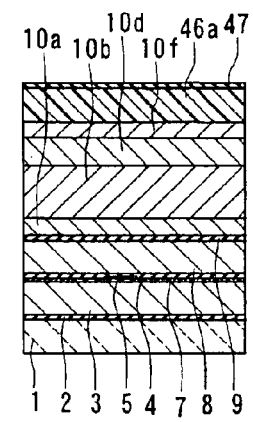
FIG. 24A          FIG. 24B
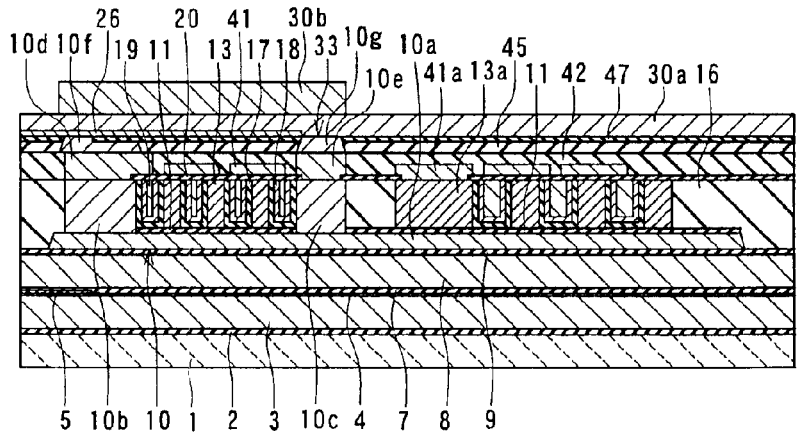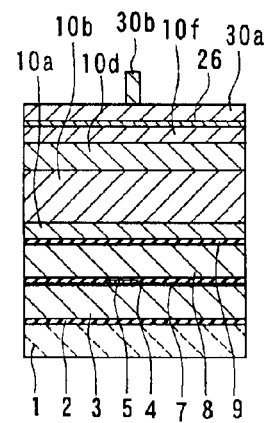
FIG. 25A          FIG. 25B

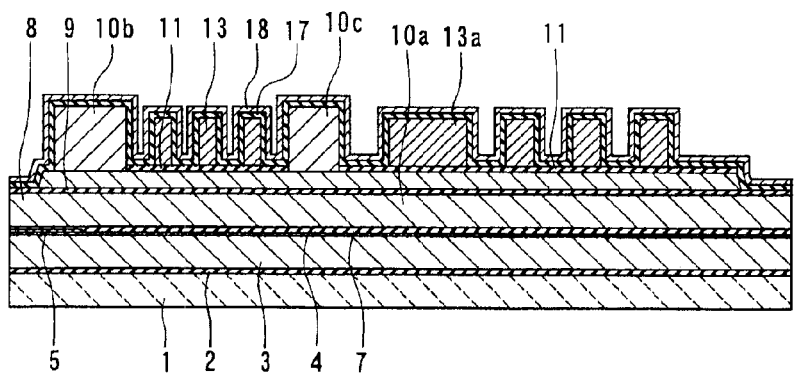 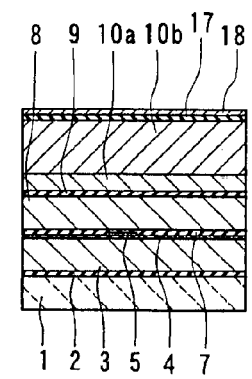
FIG. 30A  FIG. 30B
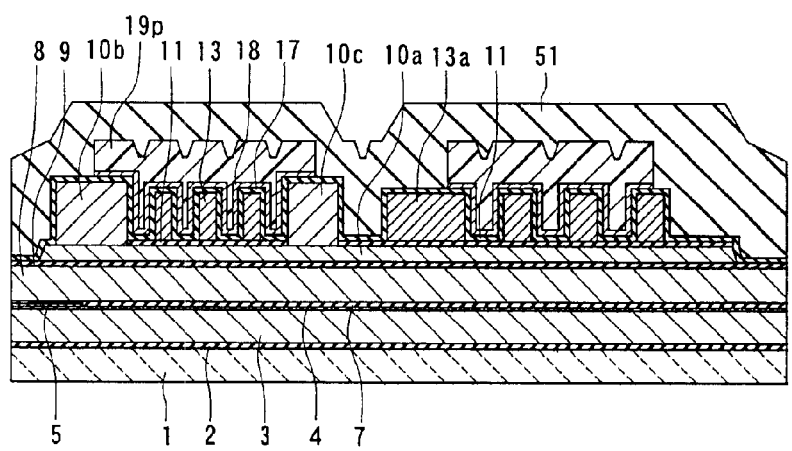 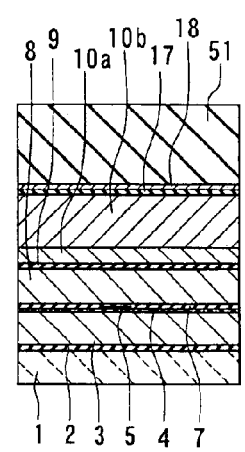
FIG. 31A  FIG. 31B

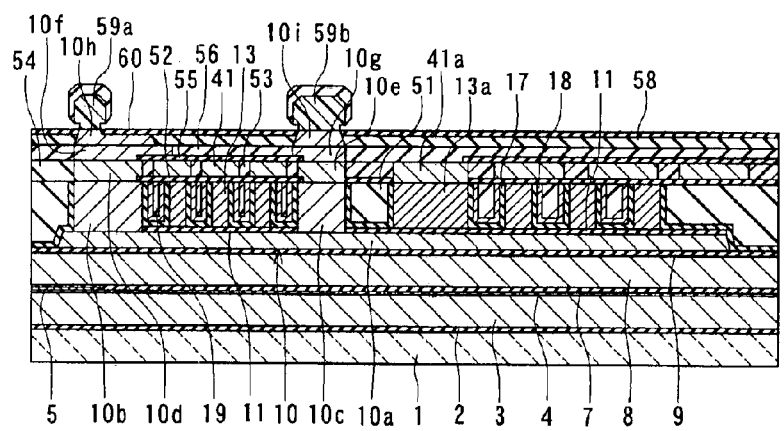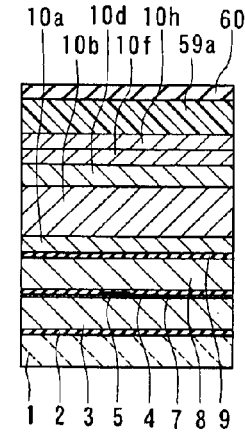
FIG. 36A    FIG. 36B
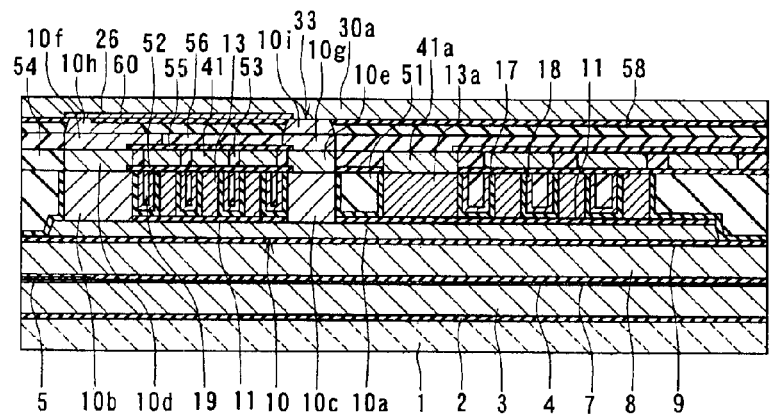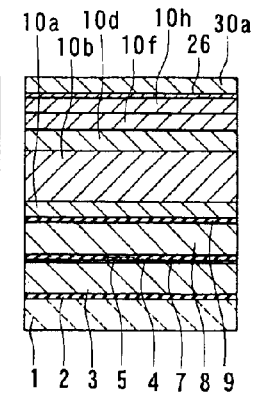
FIG. 37A    FIG. 37B

THIN-FILM MAGNETIC HEAD COMPRISING A FIRST POLE LAYER HAVING MULTIPLE LAYERS INCLUDING A SECOND LAYER AND A THIN-FILM COIL HAVING A PORTION DISPOSED BETWEEN THE SECOND LAYER AND A COUPLING PORTION AND METHOD OF MANUFACTURING THE THIN-FILM MAGNETIC HEAD

BACKGROUND OF THE INVENTION

1. Field of the Invention

The present invention relates to a thin-film magnetic head having at least an induction-type electromagnetic transducer, and to a method of manufacturing the same.

2. Description of the Related Art

Recent years have seen significant improvements in the areal recording density of hard disk drives. In particular, areal recording densities of latest hard disk drives have reached 80 to 100 gigabytes per platter and are even exceeding that level. It is therefore required to improve the performance of thin-film magnetic heads.

Among the thin-film magnetic heads, widely used are composite thin-film magnetic heads made of a layered structure including a recording (write) head having an induction-type electromagnetic transducer for writing and a reproducing (read) head having a magnetoresistive element (that may be hereinafter called an MR element) for reading.

In general, the write head incorporates: a medium facing surface (an air bearing surface) that faces toward a recording medium; a bottom pole layer and a top pole layer that are magnetically coupled to each other and include magnetic pole portions opposed to each other and located in regions of the pole layers on a side of the medium facing surface; a recording gap layer provided between the magnetic pole portions of the top and bottom pole layers; and a thin-film coil at least part of which is disposed between the top and bottom pole layers and insulated from the top and bottom pole layers. In the typical write head, the bottom pole layer and the top pole layer are magnetically coupled to each other via a coupling portion which is located away from the medium facing surface.

Higher track densities on a recording medium are essential to enhancing the recording density among the performances of the write head. To achieve this, it is required to implement the write head of a narrow track structure in which the track width, that is, the width of the two magnetic pole portions opposed to each other with the recording gap layer disposed in between, the width being taken in the medium facing surface, is reduced down to microns or the order of submicron. Semiconductor process techniques are utilized to achieve the write head having such a structure.

As the track width is decreased, it becomes harder to generate a high-density magnetic flux between the two magnetic pole portions that are opposed to each other with the recording gap layer in between. It is therefore desirable that the pole portions be made of a magnetic material having a higher saturation flux density.

When the frequency of the write signal is raised to increase the recording density, it is required for the write head that the speed of change of flux be improved, that is, the flux rise time be reduced. It is also required that degradation in the writing characteristics such as the overwrite property and the non-linear transition shift in a high frequency band be minimized. To improve the writing characteristics in the high frequency band, it is preferable to reduce the magnetic path length. The magnetic path length is determined chiefly by the length of a portion of the bottom or top pole layer located between the coupling portion and the medium facing surface (referred to as a yoke length in the present application). A reduction in yoke length is therefore effective in reducing the magnetic path length. To reduce the yoke length, it is effective to reduce the pitch of the turns of the thin-film coil, or the pitch of a portion of the turns which lies between the coupling portion and the medium facing surface, in particular.

One of prior-art techniques for reducing the pitch of turns of the thin-film coil is to form a recess in the bottom pole layer and dispose the thin-film coil in the recess. (See the U.S. Pat. No. 6,043,959 and the U.S. Pat. No. 6,259,583B1.)

According to the method of manufacturing a thin-film magnetic head disclosed in the U.S. Pat. No. 6,043,959, the bottom pole layer, the top pole layer and the thin-film coil are formed through the following steps. First, the bottom pole layer patterned into a specific shape is formed. Next, a recording gap layer and a magnetic layer are formed on the bottom pole layer one by one. A portion of the magnetic layer is coupled to the bottom pole layer. Next, masks are formed in a region in which a pole portion of the top pole layer is to be formed and in a region in which a coupling portion is to be formed. The magnetic layer, the recording gap layer and the bottom pole layer are etched, using the masks. As a result, a pole portion layer to be the pole portion of the top pole layer and a coupling layer to be the coupling portion are made up of the magnetic layer that has been etched. Through the above-mentioned etching, a trim structure is formed, wherein the sidewalls of the pole portion of the top pole layer, the recording gap layer and a portion of the bottom pole layer are formed vertically in a self-aligned manner. Furthermore, a recess in which the thin-film coil is to be disposed is formed in the bottom pole layer. Next, an insulating film is formed over the entire surface. The thin-film coil is then formed on the insulating film in the recess. Next, a thick insulating layer is formed over the entire surface and the top surface of the insulating layer is flattened, so that the pole portion layer of the top pole layer and the coupling layer are exposed. A yoke portion layer of the top pole layer is then formed on the flattened surface so as to couple the pole portion layer to the coupling layer.

According to the method of manufacturing a thin-film magnetic head disclosed in the U.S. Pat. No. 6,259,583B1, the bottom pole layer, the top pole layer and the thin-film coil are formed through the following steps. First, the bottom pole layer patterned into a specific shape is formed. Next, a pole portion layer to be the pole portion of the bottom pole layer and a coupling layer to be a coupling portion are formed on the bottom pole layer. Next, an insulating film is formed over the entire surface. The thin-film coil is then formed by plating on the insulating film, so that part of the coil passes between the pole portion layer and the coupling layer. Next, a thick insulating layer is formed over the entire surface and the top surface of the insulating layer is flattened, so that the pole portion layer and the coupling layer are exposed. A recording gap layer is then formed on the flattened surface. A contact hole is made in a region of the recording gap layer located above the coupling layer. Next, the top pole layer is formed on the recording gap layer. The top pole layer is connected to the coupling layer through the contact hole.

Another known technique for reducing the pitch of turns of the thin-film coil is to place the turns of a second coil between the turns of a first coil. (See the U.S. Pat. No. 6,191,916B1.)

As described above, it is desirable to reduce the yoke length of the thin-film magnetic head for improving the writing characteristics in the high frequency band. To achieve this, it is effective to reduce the pitch of part of the turns of the thin-film coil located between the coupling portion and the medium facing surface. On the other hand, it is desirable to increase the number of turns of the coil so as to improve the writing characteristics of the magnetic head.

To increase the number of turns of the coil and to reduce the yoke length at the same time, it is inevitable to reduce the width of the part of the coil located between the coupling portion and the medium facing surface. However, a problem that the resistance of the coil increases thereby arises.

As the resistance of the thin-film coil increases, there arises a problem that the pole portions may protrude toward the recording medium due to the heat the thin-film coil generates so that the pole portions are likely to collide with the recording medium.

Therefore, in the conventional thin-film magnetic head, to avoid the problem that may result from an increase in the resistance of the thin-film coil, it has been unfeasible to considerably reduce the yoke length.

The thin-film coil is typically formed through frame plating. The frame used for frame plating has walls each of which is disposed between adjacent turns of the coil. It is necessary that each of the walls be wide enough to maintain the shape of each of the walls. As a result, it is difficult to reduce the space between adjacent turns of the coil when the coil is formed through frame plating.

Through the use of the technique disclosed in the U.S. Pat. No. 6,191,916B1, it is possible to reduce the space between adjacent turns. In the thin-film magnetic head disclosed in the U.S. Pat. No. 6,191,916B1, however, the top pole layer including the pole portion that defines the track width is formed on an insulating layer covering the thin-film coil and rising like a plateau. It is therefore difficult to make the pole portion that defines the track width be small in size with precision.

OBJECT AND SUMMARY OF THE INVENTION

It is an object of the invention to provide a thin-film magnetic head that has a reduced track width for improving writing density, and that has a reduced magnetic path length and thus exhibits excellent writing characteristics in the high frequency band, and that has a thin-film coil with a low resistance, and a method of manufacturing such a thin-film magnetic head.

A thin-film magnetic head of the invention comprises: a medium facing surface that faces toward a recording medium; a first pole layer and a second pole layer that include magnetic pole portions opposed to each other and located in regions of the pole layers on a side of the medium facing surface; a coupling portion located away from the medium facing surface, and including at least one of a portion of the first pole layer and a portion of the second pole layer, and magnetically coupling the first pole layer to the second pole layer; a gap layer provided between the pole portion of the first pole layer and the pole portion of the second pole layer; and a thin-film coil disposed around the coupling portion, at least part of the coil being disposed between the first and second pole layers and insulated from the first and second pole layers.

In the thin-film magnetic head of the invention, the first pole layer incorporates: a first layer disposed to face toward the thin-film coil; a second layer disposed near the medium facing surface and connected to the first layer in such a manner that the second layer protrudes closer toward the second pole layer than the first layer; and a third layer disposed near the medium facing surface and connected to the second layer in such a manner that the third layer protrudes closer toward the second pole layer than the second layer. The thin-film coil incorporates: a first coil having turns part of which is disposed between the second layer and the coupling portion; a second coil having turns at least part of which is disposed between the turns of the first coil; and a connecting layer disposed on a side of the third layer and connecting the first coil to the second coil in series. The thin-film magnetic head further comprises: a first insulating film disposed between the first layer and the first and second coils; a second insulating film disposed between the turns of the first coil and the turns of the second coil; a third insulating film disposed between the connecting layer and the first and second coils; and a fourth insulating film disposed around the connecting layer.

In the thin-film magnetic head of the invention the turns of the first coil are adjacent to the turns of the second coil, the second insulating film being disposed in between. The thin-film coil is made up of the first and second coils connected in series to each other by means of the connecting layer.

According to the thin-film magnetic head of the invention, each of the first coil, the second coil and the connecting layer may be made of a metal or copper in particular.

According to the thin-film magnetic head of the invention, the second layer, the first coil and the second coil may have surfaces facing toward the second pole layer, the surfaces being located in one plane. According to the thin-film magnetic head of the invention, the third layer, the connecting layer and the fourth insulating film may have surfaces facing toward the second pole layer, the surfaces being located in one plane. According to the thin-film magnetic head of the invention, the fourth insulating film may cover the connecting layer. In addition, the third layer and the fourth insulating film may have surfaces facing toward the second pole layer, the surfaces being located in one plane.

According to the thin-film magnetic head of the invention, the connecting layer may have turns disposed around the coupling portion.

According to the thin-film magnetic head of the invention, the first pole layer may further incorporate a fourth layer defining a throat height, the fourth layer being connected to the third layer in such a manner that the fourth layer protrudes closer toward the second pole layer than the third layer. In this case, the third layer may have a portion disposed to face toward at least one of part of the first coil and part of the second coil, the third insulating film being disposed in between.

According to the thin-film magnetic head of the invention, the first pole layer may further incorporate: a fourth layer connected to the third layer in such a manner that the fourth layer protrudes closer toward the second pole layer than the third layer; and a fifth layer defining a throat height, the fifth layer being connected to the fourth layer in such a manner that the fifth layer protrudes closer toward the second pole layer than the fourth layer. In this case, the connecting layer may have turns disposed around the coupling portion. The thin-film magnetic head may further comprise a fifth insulating film covering a surface of the connecting layer facing toward the second pole layer, and the fourth layer may have a portion disposed to face toward part of the connecting layer, the fifth insulating film being disposed in between.

According to the thin-film magnetic head of the invention, the connecting layer may have a thickness smaller than the thickness of each of the first coil and the second coil. The second pole layer may be a flat layer.

A thin-film magnetic head manufactured through a method of manufacturing the thin-film magnetic head of the invention comprises: a medium facing surface that faces toward a recording medium; a first pole layer and a second pole layer that include magnetic pole portions opposed to each other and located in regions of the pole layers on a side of the medium facing surface; a coupling portion located away from the medium facing surface, and including at least one of a portion of the first pole layer and a portion of the second pole layer, and magnetically coupling the first pole layer to the second pole layer; a gap layer provided between the pole portion of the first pole layer and the pole portion of the second pole layer; and a thin-film coil disposed around the coupling portion, at least part of the coil being disposed between the first and second pole layers and insulated from the first and second pole layers.

The first pole layer incorporates: a first layer disposed to face toward the thin-film coil; a second layer disposed near the medium facing surface and connected to the first layer in such a manner that the second layer protrudes closer toward the second pole layer than the first layer; and a third layer disposed near the medium facing surface and connected to the second layer in such a manner that the third layer protrudes closer toward the second pole layer than the second layer. The thin-film coil incorporates: a first coil having turns part of which is disposed between the second layer and the coupling portion; a second coil having turns at least part of which is disposed between the turns of the first coil; and a connecting layer disposed on a side of the third layer and connecting the first coil to the second coil in series.

The method of manufacturing the thin-film magnetic head of the invention comprises the steps of forming the first layer; forming a first insulating film on the first layer; forming the first coil on the first insulating film; forming the second layer and the coupling portion on the first layer; forming a second insulating film on sidewalls of the turns of the first coil; forming the second coil in such a manner that only the second insulating film is provided between the turns of the first coil and the turns of the second coil; forming a third insulating film to cover the first and second coils; forming the connecting layer on the third insulating film; forming the third layer on the second layer; forming a fourth insulating film around the connecting layer; forming the gap layer on the pole portion of the first pole layer; and forming the second pole layer on the gap layer.

According to the method of the invention, each of the first coil, the second coil and the connecting layer may be made of a metal or copper in particular.

The method of the invention may further comprise the step of flattening the top surfaces of the second layer, the first coil and the second coil after the second layer, the first coil and the second coil are formed. The method of the invention may further comprise the step of flattening the top surfaces of the third layer, the connecting layer and the fourth insulating film after the third layer, the connecting layer and the fourth insulating film are formed. According to the method of the invention, the fourth insulating film may be formed to cover the connecting layer. In addition, the method may further comprise the step of flattening top surfaces of the third layer and the fourth insulating film after the third layer and the fourth insulating film are formed.

According to the method of the invention, the connecting layer may be formed to have turns disposed around the coupling portion.

According to the method of the invention, the first pole layer may be formed to further incorporate a fourth layer defining a throat height, the fourth layer being connected to the third layer in such a manner that the fourth layer protrudes closer toward the second pole layer than the third layer. In addition, the method may further comprise the step of forming the fourth layer on the third layer. In this case, the third layer may be formed to have a portion disposed to face toward at least one of part of the first coil and part of the second coil, the third insulating film being disposed in between.

According to the method of the invention, the first pole layer may be formed to further incorporate: a fourth layer connected to the third layer in such a manner that the fourth layer protrudes closer toward the second pole layer than the third layer; and a fifth layer defining a throat height, the fifth layer being connected to the fourth layer in such a manner that the fifth layer protrudes closer toward the second pole layer than the fourth layer. In addition, the method may further comprise the step of forming the fourth layer on the third layer, and the step of forming the fifth layer on the fourth layer. In this case, the connecting layer may be formed to have turns disposed around the coupling portion. The method of the invention may further comprise the step of forming a fifth insulating film covering a top surface of the connecting layer, and the fourth layer may be formed to have a portion disposed to face toward part of the connecting layer, the fifth insulating film being disposed in between.

According to the method of the invention, the connecting layer may be formed to have a thickness smaller than the thickness of each of the first coil and the second coil. According to the method of the invention, the second pole layer may be made flat.

According to the method of the invention, the second insulating film may be formed by stacking a plurality of alumina films made through chemical vapor deposition.

Other and further objects, features and advantages of the invention will appear more fully from the following description.

BRIEF DESCRIPTION OF THE DRAWINGS

FIG. 1A and FIG. 1B are cross-sectional views for illustrating a step in a method of manufacturing a thin-film magnetic head of a first embodiment of the invention.

FIG. 2A and FIG. 2B are cross-sectional views for illustrating a step that follows FIG. 1A and FIG. 1B.

FIG. 3A and FIG. 3B are cross-sectional views for illustrating a step that follows FIG. 2A and FIG. 2B.

FIG. 4A and FIG. 4B are cross-sectional views for illustrating a step that follows FIG. 3A and FIG. 3B.

FIG. 7A and FIG. 7B are cross-sectional views for illustrating a step that follows FIG. 6A and FIG. 6B.

FIG. 8A and FIG. 8B are cross-sectional views for illustrating a step that follows FIG. 7A and FIG. 7B.

FIG. 9A and FIG. 9B are cross-sectional views for illustrating a step that follows FIG. 8A and FIG. 8B.

FIG. 10A and FIG. 10B are cross-sectional views for illustrating a step that follows FIG. 9A and FIG. 9B.

FIG. 13A and FIG. 13B are cross-sectional views for illustrating a step that follows FIG. 12A and FIG. 12B.

FIG. 14A and FIG. 14B are cross-sectional views for illustrating a step that follows FIG. 13A and FIG. 13B.

FIG. 22A and FIG. 22B are cross-sectional views for illustrating a step that follows FIG. 21A and FIG. 21B.

FIG. 23A and FIG. 23B are cross-sectional views for illustrating a step that follows FIG. 22A and FIG. 22B.

FIG. 24A and FIG. 24B are cross-sectional views for illustrating a step that follows FIG. 23A and FIG. 23B.

FIG. 25A and FIG. 25B are cross-sectional views for illustrating a step that follows FIG. 24A and FIG. 24B.

FIG. 30A and FIG. 30B are cross-sectional views for illustrating a step in a method of manufacturing a thin-film magnetic head of a third embodiment of the invention.

FIG. 31A and FIG. 31B are cross-sectional views for illustrating a step that follows FIG. 30A and FIG. 30B.

FIG. 36A and FIG. 36B are cross-sectional views for illustrating a step that follows FIG. 35A and FIG. 35B.

FIG. 37A and FIG. 37B are cross-sectional views for illustrating a step that follows FIG. 36A and FIG. 36B.

DETAILED DESCRIPTION OF THE PREFERRED EMBODIMENTS

Embodiments of the invention will now be described in detail with reference to the accompanying drawings.

[First Embodiment]

Figure 18:
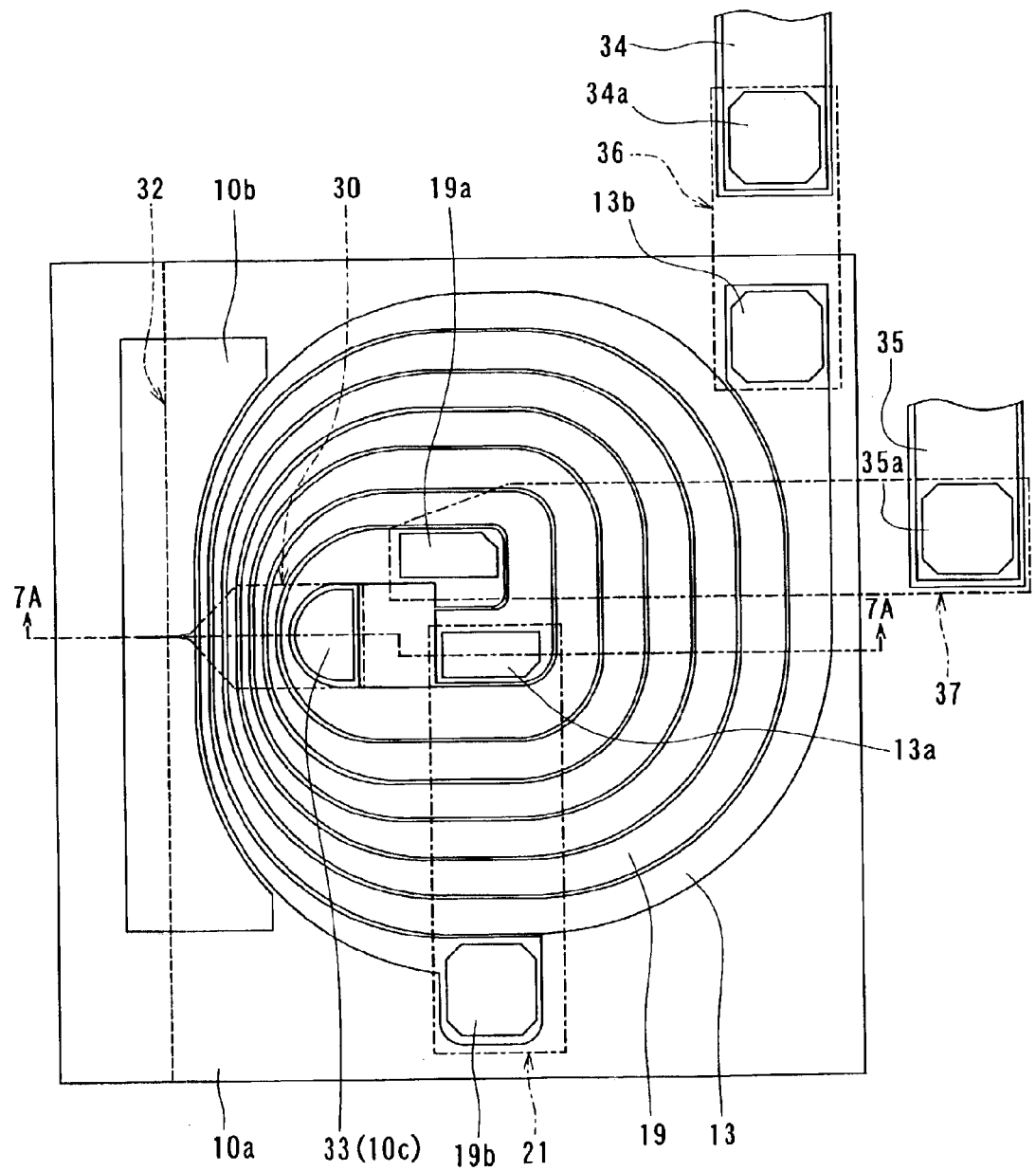
FIG. 18 is a plan view for illustrating the configuration and arrangement of the thin-film coil of the thin-film magnetic head of the first embodiment of the invention.
Figure 19:
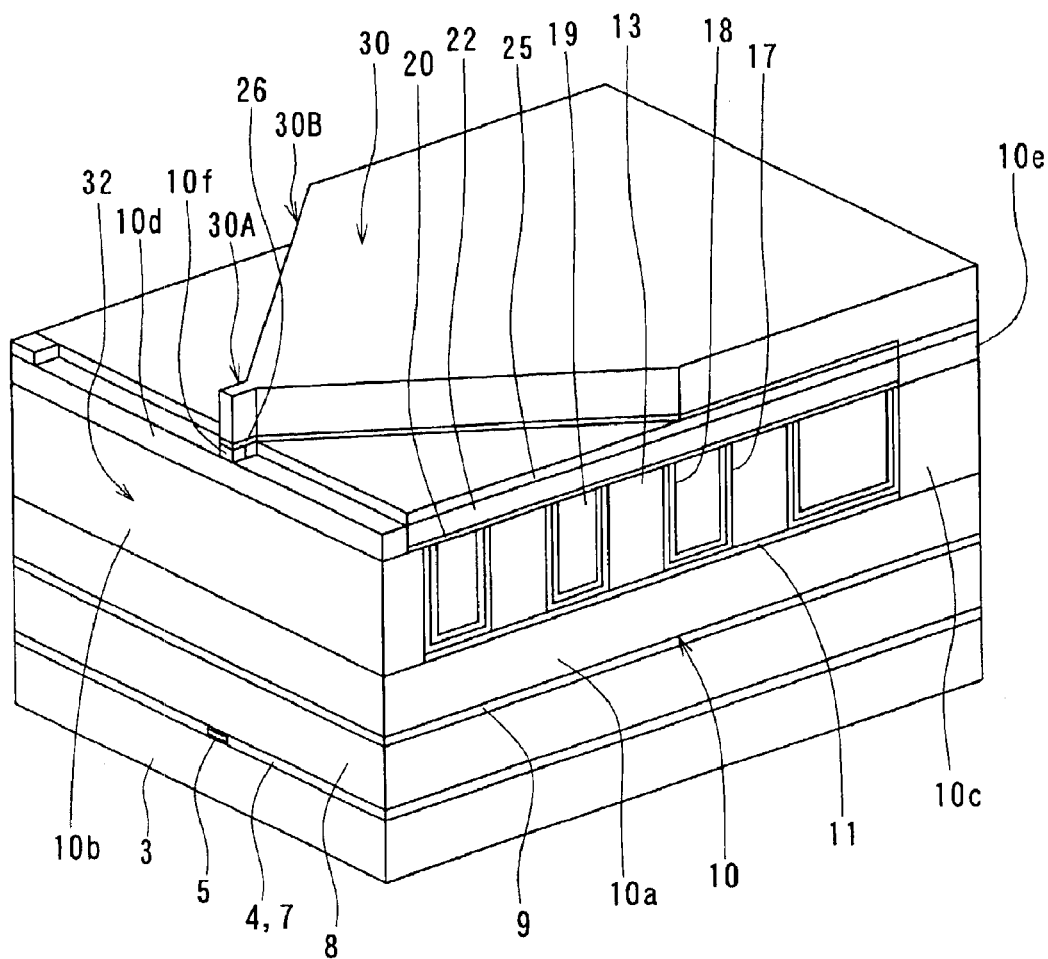
FIG. 19 is a perspective view for illustrating the configuration of the thin-film magnetic head of the first embodiment.

Reference is now made to FIG. 1A to FIG. 17A, FIG. 1B to FIG. 17B, FIG. 18 and FIG. 19 to describe a method of manufacturing a thin-film magnetic head of a first embodiment of the invention. FIG. 1A to FIG. 17A are cross sections orthogonal to the air bearing surface and the top surface of a substrate. FIG. 1B to FIG. 17B are cross sections of magnetic pole portions each of which is parallel to the air bearing surface. FIG. 18 is a plan view showing the configuration and arrangement of a thin-film coil of the thin-film magnetic head of the embodiment. FIG. 19 is a perspective view for illustrating the configuration of the thin-film magnetic head in which an overcoat layer is omitted.

In the method of manufacturing the thin-film magnetic head of the embodiment, as shown in FIG. 1A and FIG. 1B, an insulating layer 2 made of alumina ($Al_2O_3$), for example, is deposited to a thickness of approximately 1 to 3 µm on a substrate 1 made of aluminum oxide and titanium carbide ($Al_2O_3$—TiC), for example. Next, a bottom shield layer 3 for a read head, made of a magnetic material such as Permalloy and having a thickness of approximately 2 to 3 µm, is formed on the insulating layer 2. The bottom shield layer 3 is selectively formed on the insulating layer 2 by plating through the use of a photoresist film as a mask, for example. Although not shown, an insulating layer that is made of alumina, for example, and has a thickness of 3 to 4 µm, for example, is formed over the entire surface. The insulating layer is then polished by chemical mechanical polishing (hereinafter referred to as CMP), for example, to expose the bottom shield layer 3 and to flatten the surface.

On the bottom shield layer 3, a bottom shield gap film 4 serving as an insulating film and having a thickness of approximately 20 to 40 nm, for example, is formed. On the bottom shield gap film 4, an MR element 5 for magnetic signal detection having a thickness of tens of nanometers is formed. For example, the MR element 5 may be formed by selectively etching an MR film formed by sputtering. The MR element 5 is located near a region in which the air bearing surface described later is to be formed. The MR element 5 may be an element made up of a magnetosensitive film that exhibits magnetoresistivity, such as an AMR element, a GMR element or a TMR (tunnel magnetoresistive) element. Next, although not shown, a pair of electrode layers, each having a thickness of tens of nanometers, to be electrically connected to the MR element 5 are formed on the bottom shield gap film 4. A top shield gap film 7 serving as an insulating film and having a thickness of approximately 20 to 40 nm, for example, is formed on the bottom shield gap film 4 and the MR element 5. The MR element 5 is embedded in the shield gap films 4 and 7. Examples of insulating materials used for the shield gap films 4 and 7 include alumina, aluminum nitride, and diamond-like carbon (DLC). The shield gap films 4 and 7 may be formed by sputtering or chemical vapor deposition (hereinafter referred to as CVD).

Next, a top shield layer 8 for a read head, made of a magnetic material and having a thickness of approximately 1.0 to 1.5 µm, is selectively formed on the top shield gap film 7. Next, although not shown, an insulating layer made of alumina, for example, and having a thickness of 2 to 3 µm, for example, is formed over the entire surface, and polished by CMP, for example, so that the top shield layer 8 is exposed, and the surface is flattened.

An insulating layer 9 made of alumina, for example, and having a thickness of approximately 0.3 µm, for example, is formed over the entire top surface of the layered structure obtained through the foregoing steps. On the entire top surface of the insulating layer 9, a magnetic layer 10ap made of a magnetic material and having a thickness of approximately 0.5 to 1.0 µm is formed. The magnetic layer 10ap has a top surface that is flat throughout. The magnetic layer 10ap is to be used for making a first layer 10a of a bottom pole layer 10 described later. The bottom pole layer 10 includes the first layer 10a, and a second layer 10b, a third layer 10d, a fourth layer 10f, and coupling layers 10c, 10e and 10g that will be described later.

The magnetic layer 10ap may be formed by plating, using NiFe (80 weight % Ni and 20 weight % Fe), or a high saturation flux density material such as NiFe (45 weight % Ni and 55 weight % Fe), CoNiFe (10 weight % Co, 20 weight % Ni and 70 weight % Fe), or FeCo (67 weight % Fe and 33 weight % Co). Alternatively, the magnetic layer 10ap may be formed by sputtering, using a high saturation flux density material such as CoFeN, FeAlN, FeN, FeCo, or FeZrN. In this embodiment the magnetic layer 10ap is formed by sputtering to have a thickness of 0.5 to 0.6 µm by way of example.

Next, an insulating film 11 made of alumina, for example, and having a thickness of 0.2 µm, for example, is formed on the magnetic layer 10ap. The insulating film 11 is then selectively etched to form openings in the insulating film 11 in regions in which the second layer 10b and the coupling layer 10c are to be formed.

Next, although not shown, an electrode film of a conductive material having a thickness of 50 to 80 nm is formed by sputtering, for example, so as to cover the first layer 10a and the insulating film 11. This electrode film functions as an electrode and a seed layer for plating. Next, although not shown, a frame is formed on the electrode film by photolithography. The frame will be used for forming a first coil 13 by frame plating.

Next, electroplating is performed, using the electrode film, to form the first coil 13 made of a metal such as copper (Cu) and having a thickness of approximately 3.5 µm. The first coil 13 is disposed in the region in which the insulating film 11 is located. In FIG. 1A numeral 13a indicates a connecting portion that is provided near an inner end of the first coil 13 and is to be connected to a second thin-film coil 19 described later. Next, the frame is removed, and portions of the electrode film except the portion below the first coil 13 are then removed by ion beam etching, for example.

Next, although not shown, a frame is formed on the magnetic layer 10ap and the insulating film 11 by photolithography. The frame will be used for forming the second layer 10b and the coupling layer 10c of the bottom pole layer 10 by frame plating.

FIG. 2A and FIG. 2B illustrate the following step. In the step electroplating is performed to form the second layer 10b and the coupling layer 10c, each of which is made of a magnetic material and has a thickness of 3.5 to 4.0 µm, for example, on the magnetic layer 10ap. For example, the second layer 10b and the coupling layer 10c may be made of NiFe, CoNiFe or FeCo. In the present embodiment the second layer 10b and the coupling layer 10c is made of CoNiFe having a saturation flux density of 1.9 to 2.2 T by way of example. In the embodiment, when the second layer 10b and the coupling layer 10c are formed by plating, no specific electrode film is provided, but the unpatterned magnetic layer 10ap is used as an electrode and a seed layer for plating.

FIG. 3A and FIG. 3B illustrate the following step. In the step a photoresist layer 14 is formed to cover the first coil 13, the second layer 10b and the coupling layer 10c. Using the photoresist layer 14 as a mask, the magnetic layer 10ap is selectively etched by reactive ion etching or ion beam etching, for example. The magnetic layer 10ap is thus patterned to complete the first layer 10a. Next, the photoresist layer 14 is removed.

Next, as shown in FIG. 4A and FIG. 4B, an insulating layer 15 made of photoresist, for example, is formed in a region in which the second coil 19 described later is to be located. The insulating layer 15 is formed so that at least the space between the second layer 10b and the first coil 13, the space between the turns of the first coil 13, and the space between the coupling layer 10c and the first coil 13 are filled with the insulating layer 15. Next, an insulating layer 16 made of alumina, for example, and having a thickness of 4 to 6 µm is formed so as to cover the insulating layer 15.

Figures 5A, 5B:
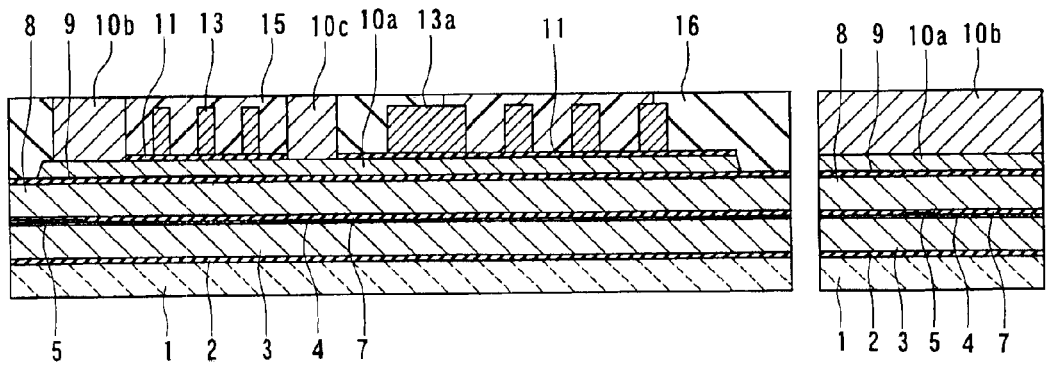
FIG. 5A and FIG. 5B are cross-sectional views for illustrating a step that follows FIG. 4A and FIG. 4B.

Next, as shown in FIG. 5A and FIG. 5B, the insulating layers 15 and 16 are polished by CMP, for example, so that the second layer 10b, the coupling layer 10c and the insulating layer 15 are exposed, and the top surfaces of the second layer 10b, the coupling layer 10c and the insulating layers 15 and 16 are flattened.

Figures 6A, 6B:
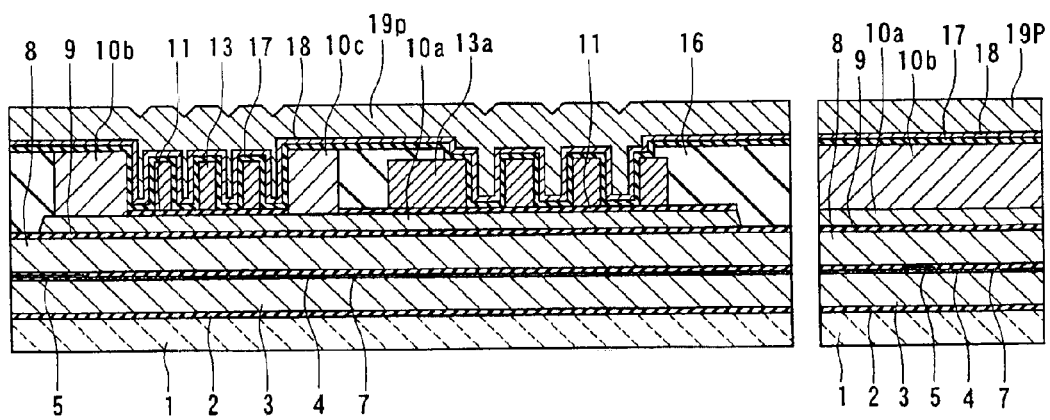
FIG. 6A and FIG. 6B are cross-sectional views for illustrating a step that follows FIG. 5A and FIG. 5B.

Next, as shown in FIG. 6A and FIG. 6B, the insulating layer 15 is removed, and an insulating film 17 made of alumina, for example, is then formed by CVD, for example, so as to cover the entire top surface of the layered structure. As a result, grooves covered with the insulating film 17 are formed in the space between the second layer 10b and the first coil 13, the space between the turns of the first coil 13, and the space between the coupling layer 10c and the first coil 13. The insulating film 17 has a thickness of 0.1 to 0.15 µm, for example. The insulating film 17 may be formed by CVD, for example, in which $H_2O$, $N_2$, $N_2O$, or $H_2O_2$ as a material used for making thin films and $Al(CH_3)_3$ or $AlCl_3$ as a material used for making thin films are alternately ejected in an intermittent manner under a reduced pressure at a temperature of 180 to 220° C. Through this method, a plurality of thin alumina films are stacked so that the insulating film 17 having a desired thickness is formed.

Next, a first conductive film made of Cu, for example, and having a thickness of 50 nm, for example, is formed by sputtering so as to cover the entire top surface of the layered structure. On the first conductive film, a second conductive film made of Cu, for example, and having a thickness of 50 nm, for example, is formed by CVD. The second conductive film is not intended to be used for entirely filling the groove between the second layer 10b and the first coil 13, the groove between the turns of the first coil 13, and the groove between the coupling layer 10c and the first coil 13, but is intended to cover the grooves, taking advantage of good step coverage of CVD. The first and second conductive films in combination are called an electrode film 18. The electrode film 18 functions as an electrode and a seed layer for plating. Next, on the electrode film 18, a conductive layer 19p made of a metal such as Cu and having a thickness of 3 to 4 µm, for example, is formed by plating. The electrode film 18 and the conductive layer 19p are used for making the second coil 19. The conductive layer 19p of Cu is formed through plating on the second conductive film of Cu formed by CVD, so that the second coil is properly formed in the space between the second layer 10b and the first coil 13, the space between the turns of the first coil 13, and the space between the coupling layer 10c and the first coil 13.

Next, as shown in FIG. 7A and FIG. 7B, the conductive layer 19p is polished by CMP, for example, so that the second layer 10b, the coupling layer 10c, and the first coil 13 are exposed. As a result, the second coil 19 is made up of the conductive layer 19p and the electrode film 18 that remain in the space between the second layer 10b and the first coil 13, the space between the turns of the first coil 13, and the space between the coupling layer 10c and the first coil 13. The above-mentioned polishing is performed such that each of the second layer 10b, the coupling layer 10c, the first coil 13 and the second coil 19 has a thickness of 2.5 to 3.0 µm, for example. The second coil 19 has turns at least part of which is disposed between turns of the first coil 13. The second coil 19 is formed such that only the insulating film 17 is provided between the turns of the first coil 13 and the turns of the second coil 19.

FIG. 18 illustrates the first coil 13 and the second coil 19. FIG. 7A is a cross section taken along line 7A—7A of FIG. 18. Connecting layers 21, 36 and 37, the top pole layer 30 and the air bearing surface 32 that will be formed later are shown in FIG. 18, too. As shown in FIG. 18, the connecting portion 13a of FIG. 7A is provided near an inner end of the first coil 13. A connecting portion 13b is provided near an outer end of the first coil 13. A connecting portion 19a is provided near an inner end of the second coil 19. A connecting portion 19b is provided near an outer end of the second coil 19.

In the step of forming the first coil 13 or the step of forming the second coil 19, two lead layers 34 and 35 are formed to be disposed outside the first layer 10a of the bottom pole layer 10, as shown in FIG. 18. The lead layers 34 and 35 have connecting portions 34a and 35a, respectively.

The connecting portions 13a and 19b are connected to each other through a connecting layer 21 that will be formed later. The connecting portions 34a and 13b are connected to each other through a connecting layer 36 that will be formed later. The connecting portions 19a and 35a are connected to each other through a connecting layer 37 that will be formed later.

Next, as shown in FIG. 8A and FIG. 8B, an insulating film 20 made of alumina, for example, and having a thickness of 0.2 to 0.3 µm is formed to cover the entire top surface of the layered structure. Etching is selectively performed on the insulating film 20 in the portions corresponding to the second layer 10b, the coupling layer 10c, the two connecting portions 13a and 13b of the first coil 13, the two connecting portions 19a and 19b of the second coil 19, the connecting portion 34a of the lead layer 34, and the connecting portion 35a of the lead layer 35. The insulating film 20 thus etched covers the top surfaces of the coils 13 and 19 except the two connecting portions 13a and 13b of the first coil 13 and the two connecting portions 19a and 19b of the second coil 19.

Next, the connecting layers 21, 36 and 37 of FIG. 18 are formed by frame plating, for example. The connecting layers 21, 36 and 37 are made of a metal such as Cu and each have a thickness of 0.8 to 1.5 µm, for example.

Next, as shown in FIG. 9A and FIG. 9B, a third layer 10d is formed on the second layer 10b, and a coupling layer 10e is formed on the coupling layer 10c each by frame plating, for example. The third layer 10d and the coupling layer 10e may be made of NiFe, CoNiFe or FeCo, for example. In the embodiment the third layer 10d and the coupling layer 10e are made of CoNiFe having a saturation flux density of 1.9 to 2.3 T by way of example. The third layer 10d and the coupling layer 10e each have a thickness of 1 to 2 µm, for example.

Next, an insulating film 22 made of alumina, for example, and having a thickness of 1 to 2 µm, for example, is formed to cover the entire top surface of the layered structure. The insulating film 22 is then polished by CMP, for example. This polishing is performed such that the top surfaces of the third layer 10d, the coupling layer 10e, the connecting layers 21, 36 and 37, and the insulating film 22 are flattened and each of these layers has a thickness of 1.0 to 1.5 µm.

Next, as shown in FIG. 10A and FIG. 10B, a magnetic layer 23 made of a magnetic material and having a thickness of 0.5 to 1.0 µm is formed by sputtering, so as to cover the entire top surface of the layered structure. The magnetic layer 23 may be made of a high saturation flux density material such as CoFeN, FeAlN, FeN, FeCo, or FeZrN. In the embodiment the magnetic layer 23 is made of CoFeN having a saturation flux density of 2.4 T by way of example.

Next, on the magnetic layer 23, an etching mask 24a is formed in the portion corresponding to the third layer 10d, and an etching mask 24b is formed in the portion corresponding to the coupling layer 10e. Each of the etching masks 24a and 24b has a thickness of 1 to 2 µm and may be made of a metal. In this case, the etching masks 24a and 24b may be formed by plating, or frame plating, in particular.

Figures 11A, 11B:
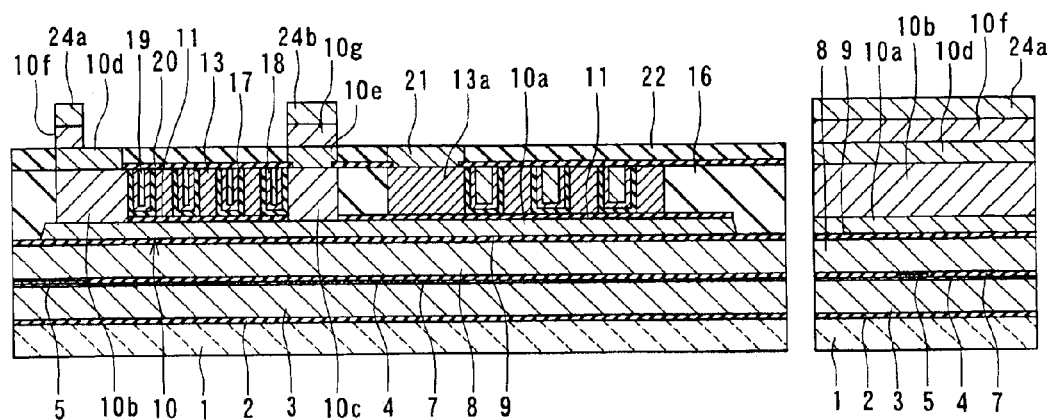
FIG. 11A and FIG. 11B are cross-sectional views for illustrating a step that follows FIG. 10A and FIG. 10B.

FIG. 11A and FIG. 11B illustrate the following step. In the step the magnetic layer 23 is selectively etched by ion beam etching, for example, through the use of the etching masks 24a and 24b. A fourth layer 10f and a coupling layer 10g are thereby formed on the third layer 10d and the coupling layer 10e, respectively. The fourth layer 10f and the coupling layer 10g are made up of portions of the magnetic layer 23 remaining under the etching masks 24a and 24b after the etching.

Figures 12A, 12B:
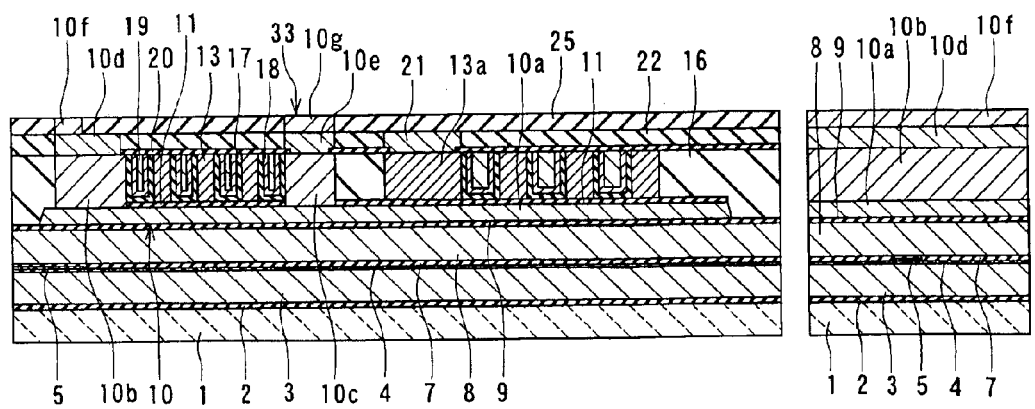
FIG. 12A and FIG. 12B are cross-sectional views for illustrating a step that follows FIG. 1A and FIG. 11B.

FIG. 12A and FIG. 12B illustrate the following step. In the step an insulating layer 25 made of alumina, for example, and having a thickness of 2 to 3 µm is formed so as to cover the entire top surface of the layered structure. The insulating layer 25 is then polished by CMP, for example, so that the fourth layer 10f and the coupling layer 10g are exposed.

An end of the fourth layer 10f located farther from the air bearing surface defines the throat height of the write head. The throat height is the length (height) of the magnetic pole portions, that is, the portions of the two pole layers opposed to each other with the recording gap layer in between, as taken from the air-bearing-surface-side end to the other end.

The coupling layers 10c, 10e and 10g constitute a coupling portion 33 for establishing magnetic coupling between the bottom pole layer 10 and the top pole layer.

Next, as shown in FIG. 13A and FIG. 13B, the recording gap layer 26 having a thickness of 0.06 to 0.09 µm is formed to cover the entire top surface of the layered structure. The recording gap layer 26 may be made of an insulating material such as alumina or a nonmagnetic metal material such as Ru, NiCu or NiB. Next, a portion of the recording gap layer 26 corresponding to the coupling layer 10g is selectively etched.

Next, a magnetic layer 27 made of a magnetic material and having a thickness of 0.8 to 1.5 µm is formed by sputtering, for example, so as to cover the entire top surface of the layered structure. The magnetic layer 27 may be made of a high saturation flux density material such as CoFeN, FeAlN, FeN, FeCo or FeZrN.

Next, an insulating layer 28 made of alumina, for example, and having a thickness of 0.5 to 1.5 µm is formed on the magnetic layer 27. Next, a magnetic layer 29 having a thickness of 1.0 to 1.5 µm, for example, is formed by frame plating, for example, on the insulating layer 28. The magnetic layer 29 may be made of NiFe (45 weight % Ni and 55 weight % Fe), CoNiFe (67 weight % Co, 15 weight % Ni and 18 weight % Fe) having a saturation flux density of 1.9 to 2.1

T, or FeCo (60 weight % Fe and 40 weight % Co) having a saturation flux density of 2.4 T. The magnetic layer 29 is disposed to extend from a region corresponding to the fourth layer 10f of the bottom pole layer 10 to a region corresponding to the coupling layer 10g. The magnetic layer 29 has a shape corresponding to the shape of the top pole layer that will be formed later. The magnetic layer 29 has a portion for defining the track width. This portion has a width of 0.1 to 0.2 µm, for example.

Next, as shown in FIG. 14A and FIG. 14B, the insulating layer 28 is selectively etched by reactive ion etching, for example, using the magnetic layer 29 as an etching mask. A halogen gas such as $Cl_2$ or a mixture of $BCl_3$ and $Cl_2$ is utilized for this etching. The magnetic layer 29 may be either removed or left unremoved through the etching. If the magnetic layer 29 is removed, it is possible to perform etching of the magnetic layer 27 later with more accuracy.

Figures 15A, 15B:
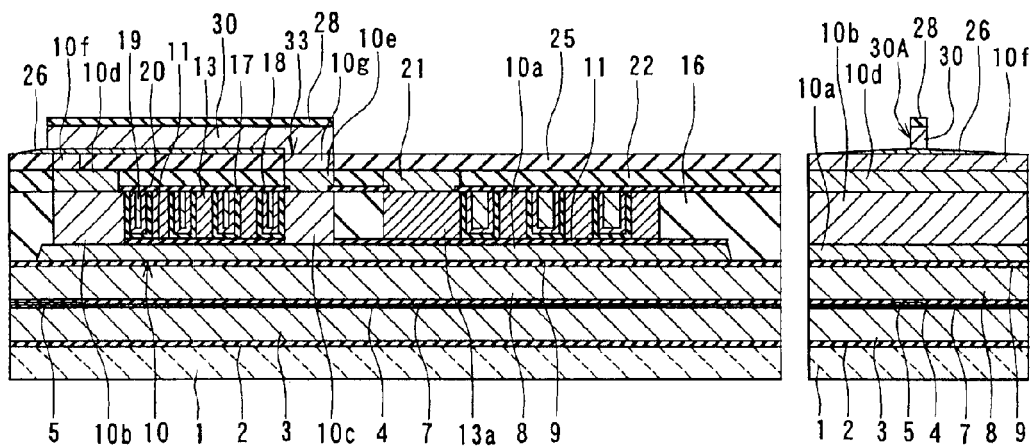
FIG. 15A and FIG. 15B are cross-sectional views for illustrating a step that follows FIG. 14A and FIG. 14B.

Next, as shown in FIG. 15A and FIG. 15B, the magnetic layer 27 is selectively etched by reactive ion etching, for example, using the insulating layer 28 as an etching mask. The magnetic layer 27 is preferably etched at a temperature of 50° C. or greater so that the etching rate is increased. More preferably, the temperature falls within the range between 200 and 250° C. inclusive so that the etching is more successfully performed.

It is preferred to use a gas containing a halogen gas and $O_2$ or $CO_2$ for etching the magnetic layer 27. The halogen gas may be a gas containing at least one of $Cl_2$ and $BCl_3$. Through the use of the mixture of $O_2$ and a halogen gas containing $Cl_2$, the profile of the magnetic layer 27 that has been etched is controlled with accuracy. If the mixture of $O_2$ and a halogen gas containing $Cl_2$ and $BCl_3$ is used, in particular, deposites of molecules of the halogen gas will be removed so that the surface of the layered structure is made very clean.

The rate of etching the magnetic layer 27 is higher if a gas containing $Cl_2$ and $CO_2$, a gas containing $Cl_2$, $BCl_3$ and $CO_2$, or a gas containing $BCl_3$, $Cl_2$, $O_2$ and $CO_2$ is used, compared to the case in which a gas that does not contain $CO_2$ is used. As a result, the etching selectivity of the magnetic layer 27 to the etching mask is increased by 30 to 50%.

The magnetic layer 27 that has been etched serves as the top pole layer 30. As shown in FIG. 19, the top pole layer 30 includes: a track width defining portion 30A having an end located in the air bearing surface and the other end located away from the air bearing surface; and a yoke portion 30B coupled to the other end of the track width defining portion 30A. The yoke portion 30B is equal in width to the track width defining portion 30A at the interface with the track width defining portion 30A. The yoke portion 30B gradually increases in width as the distance from the track width defining portion 30A increases, and maintains a specific width to the end. The track width defining portion 30A is the pole portion of the top pole layer 30, and defines the write track width. The above-described etching of the magnetic layer 27 is performed so that the track width defining portion 30A initially has a width of approximately 0.1 to 0.2 µm.

Next, the magnetic layer 27 remaining near the track width defining portion 30A of the top pole layer 30 is removed by ion beam etching, for example. This etching may be performed such that the direction in which ion beams move forms an angle in a range between 35 and 75 degrees inclusive, for example, with respect to the direction orthogonal to the top surface of the first layer 10a.

Figures 16A, 16B:
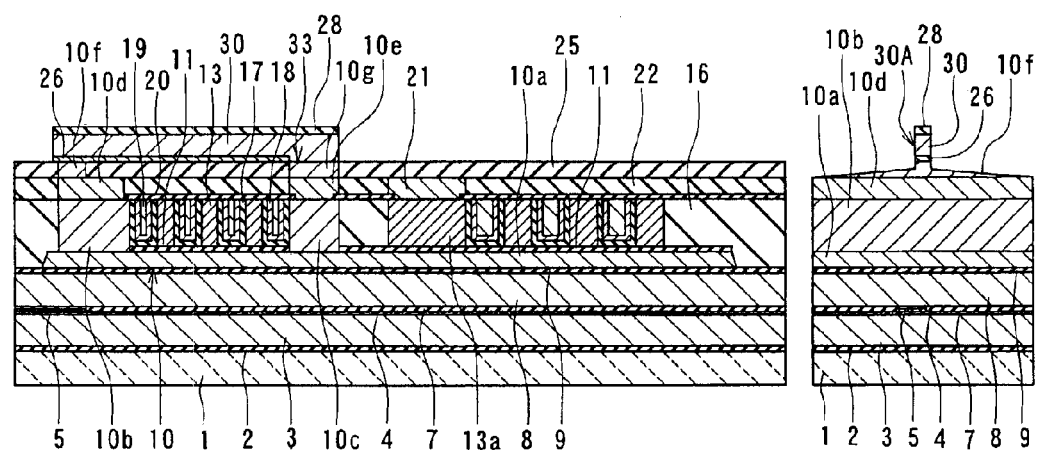
FIG. 16A and FIG. 16B are cross-sectional views for illustrating a step that follows FIG. 15A and FIG. 15B.

Next, although not shown, a photoresist mask having an opening around the track width defining portion 30A is formed. Next, as shown in FIG. 16A and FIG. 16B, a portion of the recording gap layer 26 and a portion of the fourth layer 10f of the bottom pole layer 10 around the track width defining portion 30A are etched by ion beam etching, for example, using the above-mentioned photoresist mask and the top pole layer 30 as masks. This etching may be performed such that the direction in which ion beams move forms an angle in a range between 35 and 55 degrees inclusive, for example, with respect to the direction orthogonal to the top surface of the first layer 10a. The fourth layer 10f is etched as deep as 0.3 to 0.4 µm, for example.

Next, the sidewalls of the track width defining portion 30A are etched by ion beam etching, for example, to reduce the width of the track width defining portion 30A, so that the width is made 0.1 µm, for example. This etching may be performed such that the direction in which ion beams move forms an angle in a range between 40 and 75 degrees inclusive, for example, with respect to the direction orthogonal to the top surface of the first layer 10a.

A trim structure as shown in FIG. 16B is thereby formed. The trim structure suppresses an increase in the effective recording track width due to expansion of a magnetic flux generated during writing in a narrow track. A portion of the fourth layer 10f that is opposed to the track width defining portion 30A of the top pole layer 30 with the recording gap layer 26 in between is the pole portion of the bottom pole layer 10.

Figures 17A, 17B:
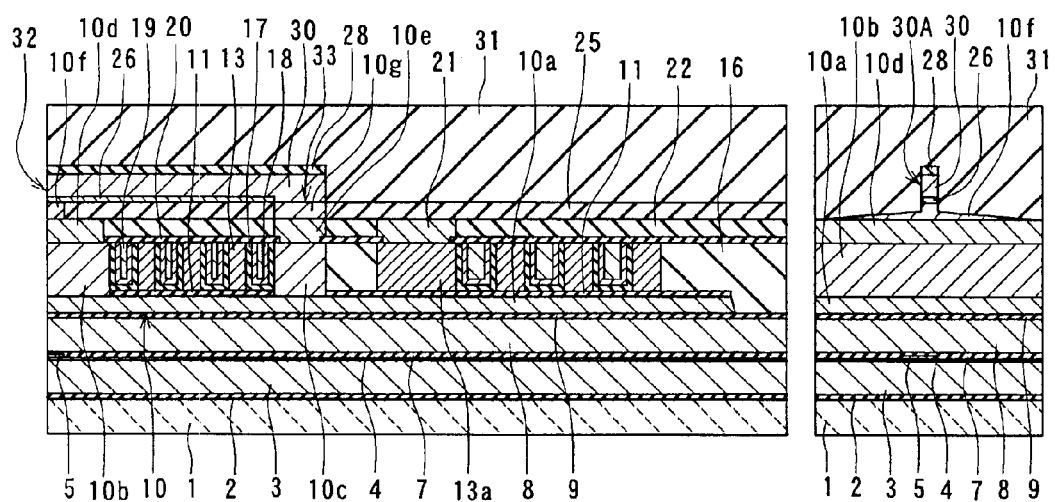
FIG. 17A and FIG. 17B are cross-sectional views for illustrating a step that follows FIG. 16A and FIG. 16B.

Next, as shown in FIG. 17A and FIG. 17B, an overcoat layer 31 made of alumina, for example, and having a thickness of 20 to 30 µm is formed so as to cover the entire top surface of the layered structure. The surface of the overcoat layer 31 is flattened, and electrode pads (not shown) are formed thereon. Finally, the slider including the foregoing layers is lapped to form the air bearing surface 32. The thin-film magnetic head including the read and write heads is thus completed.

The thin-film magnetic head of the present embodiment comprises the air bearing surface 32 serving as a medium facing surface that faces toward a recording medium. The magnetic head further comprises the read head and the write head (the induction-type electromagnetic transducer).

The read head includes: the MR element 5 located near the air bearing surface 32; the bottom shield layer 3 and the top shield layer 8 for shielding the MR element 5; the bottom shield gap film 4 located between the MR element 5 and the bottom shield layer 3; and the top shield gap film 7 located between the MR element 5 and the top shield layer 8. The portions of the bottom shield layer 3 and the top shield layer 8 located on a side of the air bearing surface 32 are opposed to each other with the MR element 5 in between.

The write head comprises the bottom pole layer 10 and the top pole layer 30 that are magnetically coupled to each other and include the pole portions opposed to each other and located in the regions of the pole layers on the side of the air bearing surface 32. The write head further comprises: the recording gap layer 26 disposed between the pole portion of the bottom pole layer 10 and the pole portion of the top pole layer 30; and the first and second coils 13 and 19. The coils 13 and 19 are provided such that at least part thereof is disposed between the bottom pole layer 10 and the top pole layer 30 and insulated from the bottom pole layer 10 and the top pole layer 30. The bottom pole layer 10 and the top pole layer 30 of the present embodiment correspond to the first pole layer and the second pole layer of the invention, respectively.

The bottom pole layer 10 includes the first layer 10a, the second layer 10b, the third layer 10d, the fourth layer 10f, and the coupling layers 10c, 10e and 10g. The first layer 10a is disposed to be opposed to the coils 13 and 19. The second layer 10b is disposed near the air bearing surface 32 and connected to the first layer 10a in such a manner that the second layer 10b protrudes closer toward the top pole layer 30 than the first layer 10a. The third layer 10d is disposed near the air bearing surface 32 and connected to the second layer 10b in such a manner that the third layer 10d protrudes closer toward the top pole layer 30 than the second layer 10b. The fourth layer 10f is disposed near the air bearing surface 32 and connected to the third layer 10d in such a manner that the fourth layer 10f protrudes closer toward the top pole layer 30 than the third layer 10d. The fourth layer 10f has an end located away from the air bearing surface 32, the end defining the throat height of the write head. The coupling layers 10c, 10e and 10g make up the coupling portion 33 (See FIG. 18.) that is located away from the air bearing surface 32 and magnetically couples the bottom pole layer 10 to the top pole layer 30. The top pole layer 30 is a flat layer.

As shown in FIG. 18, the thin-film coil of the embodiment includes the first coil 13, the second coil 19 and the connecting layer 21. The first coil 13 has turns part of which is disposed between the second layer 10b and the coupling layer 10c. The second coil 19 has turns at least part of which is disposed between turns of the first coil 13. The connecting layer 21 is disposed on a side of the third layer 10d and connects the coil 13 to the coil 19 in series. Part of the turns of the second coil 19 is disposed between the second layer 10b and the coupling layer 10c, too. The coils 13 and 19 are both flat whorl-shaped and disposed around the coupling portion 33. The coils 13 and 19 may be both wound clockwise from the outer end to the inner end. The connecting layer 21 connects the connecting portion 13a of the coil 13 to the connecting portion 19b of the coil 19 at the minimum distance. The connecting layer 21 has a thickness smaller than the thickness of each of the coils 13 and 19. The coils 13 and 19 and the connecting layer 21 are all made of a metal, such as Cu. The thin-film coil of the embodiment has seven turns although the invention is not limited to the seven-turn coil.

The write head further comprises: the insulating film 11 disposed between the first layer 10a and the coils 13 and 19; the insulating film 17 disposed between the turns of the first coil 13 and the turns of the second coil 19; the insulating film 20 disposed between the coils 13 and 19 and the connecting layer 21; and the insulating film 22 disposed around the connecting layer 21. The insulating films 11, 17, 20 and 22 correspond to the first, second, third and fourth insulating films of the invention, respectively.

In the embodiment the second layer 10b and the coils 13 and 19 have surfaces (top surfaces) facing toward the top pole layer 30 that are flattened and located in one plane.

In the embodiment the third layer 10d, the connecting layer 21 and the insulating film 22 have surfaces (top surfaces) facing toward the top pole layer 30 that are flattened and located in one plane.

According to the embodiment, the first coil 13 is formed on the first layer 10a having the top surface that is flat throughout. It is thereby possible to form the first coil 13 that is thick but small in size with accuracy. According to the embodiment, the second coil 19 is formed such that at least part thereof is disposed between turns of the first coil 13. It is thereby possible to form the second coil 19 that is thick but small in size with accuracy, too.

According to the embodiment, it is the thin insulating film 17 that separates the second layer 10b from the second coil 19, the turns of the first coil 13 from the turns of the second coil 19, and the coupling layer 10c from the second coil 19. It is thereby possible that the space between the second layer 10b and the second coil 19, the space between the turns of the first coil 13 and the turns of the second coil 19, and the space between the coupling layer 10c and the second coil 19 are made very small.

These features of the embodiment enable the coils 13 and 19 to be thick and the yoke length to be short. It is thereby possible to reduce the resistance of the thin-film coil while the yoke length is reduced, that is, the magnetic path length is reduced.

As a result, according to the embodiment of the invention, it is possible to achieve the thin-film magnetic head having a reduced magnetic path length and thus having excellent writing characteristics in a high frequency band, and having the thin-film coil with a low resistance.

According to the embodiment, an outer portion of the thin-film coil is disposed adjacent to the second layer 10b, the thin insulating film 17 being located in between. That is, the thin-film coil is disposed near the air bearing surface 32. As a result, it is possible to utilize a magnetomotive force generated by the thin-film coil for writing with efficiency. It is thereby possible to achieve the write head having an excellent overwrite property.

According to the embodiment, the top pole layer 30 is a flat layer formed on the nearly flat base layer. As a result, it is possible to form the track width defining portion 30A of the top pole layer 30 that is small in size with accuracy. It is thereby possible to reduce the track width and improve the writing density.

In the embodiment the magnetic layer 27 is etched by reactive ion etching, for example, to form the top pole layer 30, and the sidewalls of the track width defining portion 30A are then etched by ion beam etching, for example. In addition, a portion of the fourth layer 10f around the track width defining portion 30A is etched by ion beam etching, for example, using the photoresist mask and the top pole layer 30 as masks, to form the trim structure. When such etching by ion beam etching is employed, the rate at which the portion of the fourth layer 10f away from the track width defining portion 30A is etched is several times as high as the rate at which the portion of the fourth layer 10f around the track width defining portion 30A is etched. Consequently, if the portion of the fourth layer 10f around the track width defining portion 30A is required to be etched as deep as 0.3 $\mu$m, for example, the portion of the fourth layer 10f away from the track width defining portion 30A is etched by the depth several times as great as 0.3 $\mu$m. In this case, if the insulating film that covers the coils 13 and 19 are thin, there is a possibility that the coils 13 and 19 are exposed when etching is performed. To prevent this, the relatively thick insulating film 22 having a thickness of 1 to 2 $\mu$m is formed on the coils 13 and 19 in the embodiment.

According to the embodiment, the connecting layer 21 is disposed in the insulating film 22 through the use of the insulating film 22 that is required to be relatively thick. In addition, the connecting layer 21 is made of a metal, such as Cu. Such a configuration allows the connecting layer 21 having a low resistance to be disposed very close to the coils 13 and 19. As a result, the resistance of the thin-film coil is further reduced. In place of the connecting layer 21 of the embodiment, a connecting layer made of a material the same as the top pole layer 30 could be formed on the insulating layer 25 for connecting the coil 13 to the coil 19. In this case, however, the connecting layer would have a resistance higher than the connecting layer 21 of the embodiment has, and the resistance of the thin-film coil would thereby increase, too.

In the embodiment, if the second layer 10b, the third layer 10d, the fourth layer 10f and the top pole layer 30 are made of a high saturation flux density material, it is possible to prevent lines of magnetic flux from saturating halfway through the magnetic path. It is thereby possible to utilize a magnetomotive force generated by the thin-film coil for writing with efficiency, and to thereby implement the write head having an excellent overwrite property.

According to the embodiment, the top pole layer 30 is formed as follows, for example. The magnetic layer 27 made of a high saturation flux density material is etched by reactive ion etching, using an etching mask, to form the top pole layer 30. At this point the track width defining portion 30A of the top pole layer 30 has a width greater than the final width. The sidewalls of the track width defining portion 30A are then etched by ion beam etching to reduce the width of the track width defining portion 30A. The portion 30A is formed through such a method so that the track width of 0.2 μm or smaller is implemented, which has been difficult in mass-production of thin-film magnetic heads of prior art. The above-mentioned method also achieves a track width of 0.1 μm or smaller that is required to implement areal density of 150 to 200 gigabits per square inch.

The track width defining portion 30A is formed through the above-mentioned method, so that it is possible to prevent a reduction in thickness of the track width defining portion 30A and to prevent the width of a portion thereof near the top surface from being smaller than that of a portion closer to the recording gap layer 26. It is thereby possible to prevent a magnetic flux from saturating halfway through the magnetic path.

If the magnetic layer 27 is etched by reactive ion etching, using the etching mask (the insulating layer 28) of alumina, to form the top pole layer 30, it is possible that the etching mask is made thinner than an etching mask made of a magnetic material. It is thereby possible to reduce the width of the track width defining portion 30A. Consequently, it is possible to reduce the period of time for which ion beam etching is performed to reduce the width of the track width defining portion 30A. As a result, it is possible to prevent a reduction in thickness of the track width defining portion 30A and to prevent the width of the portion thereof near the top surface from being smaller than that of the portion closer to the recording gap layer 26.

If the track width defining portion 30A is formed by reactive ion etching and molecules of the halogen gas used for the reactive ion etching have deposited on the sidewalls of the track width defining portion 30A, the portion 30A may be subject to corrosion. According to the embodiment, however, the sidewalls of the portion 30A are etched by ion beam etching so that the molecules of the halogen gas are removed from the sidewalls even though the halogen gas molecules have deposited thereon. It is thereby possible to prevent corrosion of the portion 30A.

[Second Embodiment]

Figures 26A, 26B:
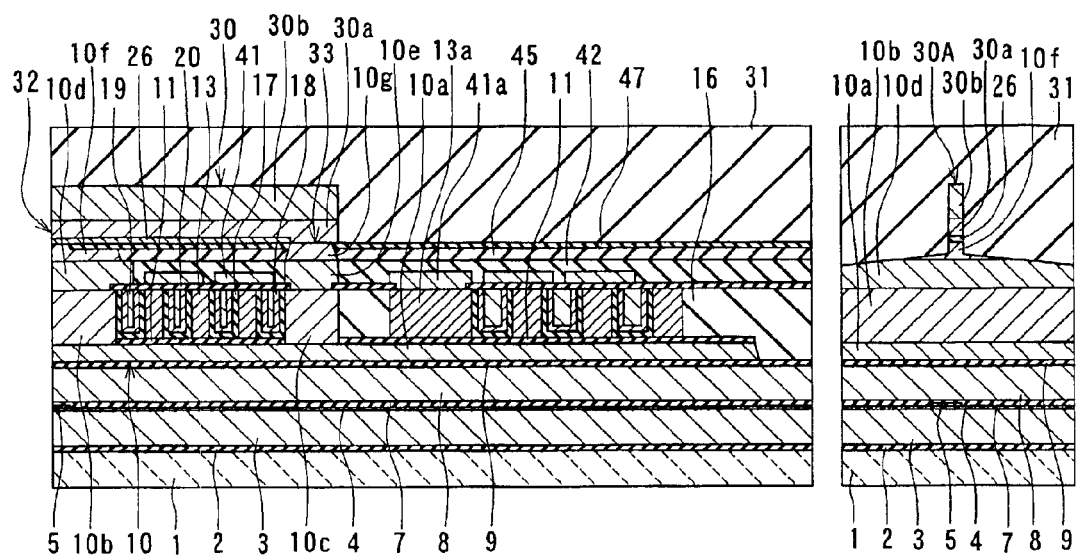
FIG. 26A and FIG. 26B are cross-sectional views for illustrating a step that follows FIG. 25A and FIG. 25B.
Figure 27:
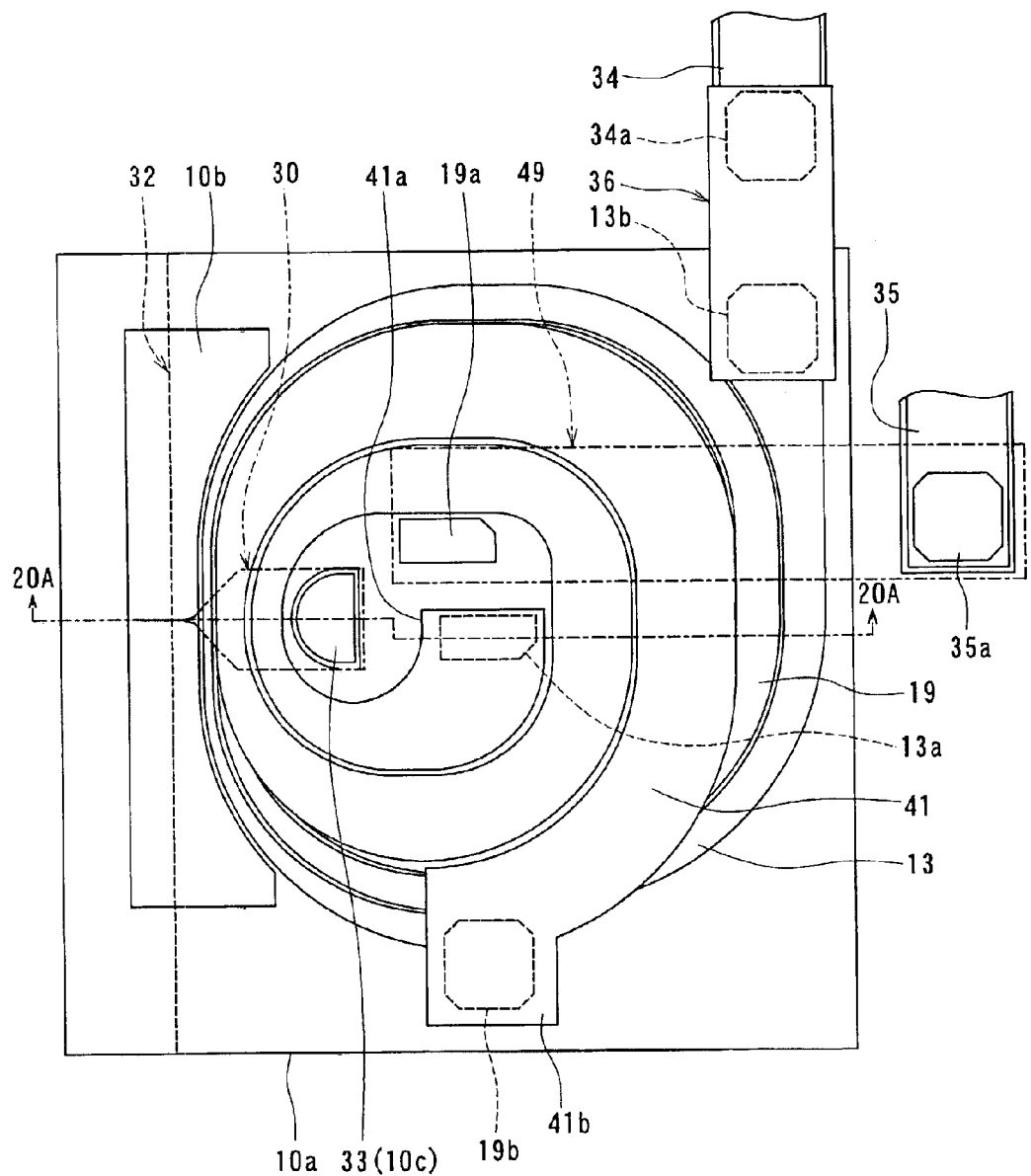
FIG. 27 is a plan view for illustrating the configuration and arrangement of a third coil of the thin-film magnetic head of the second embodiment of the invention.

Reference is now made to FIG. 20A to FIG. 26A, FIG. 20B to FIG. 26B, and FIG. 27 to describe a thin-film magnetic head and a method of manufacturing the same of a second embodiment of the invention. FIG. 20A to FIG. 26A are cross sections orthogonal to the air bearing surface and the top surface of a substrate. FIG. 20B to FIG. 26B are cross sections of magnetic pole portions each of which is parallel to the air bearing surface. FIG. 27 is a plan view for illustrating the configuration and arrangement of a third coil of the thin-film magnetic head of the second embodiment.

The method of manufacturing the thin-film magnetic head of the second embodiment includes the steps the same as those of the first embodiment that are performed until the conductive layer 19p is polished, so that the second layer 10b, the coupling layer 10c and the first coil 13 are exposed, to form the second coil 19, as shown in FIG. 7A and FIG. 7B. The first coil 13 and the second coil 19 have the shapes as shown in FIG. 18 that are the same as the first embodiment.

Figures 20A, 20B:
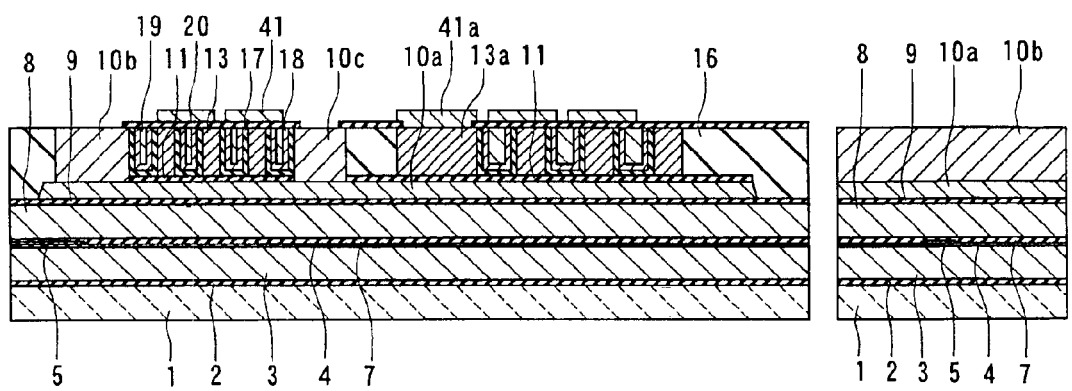
FIG. 20A and FIG. 20B are cross-sectional views for illustrating a step in a method of manufacturing a thin-film magnetic head of a second embodiment of the invention.

Next, as shown in FIG. 20A and FIG. 20B, the insulating film 20 made of alumina, for example, and having a thickness of 0.2 μm, for example, is formed to cover the entire top surface of the layered structure. Etching is selectively performed on the insulating film 20 in the portions corresponding to the second layer 10b, the coupling layer 10c, the two connecting portions 13a and 13b of the first coil 13, the two connecting portions 19a and 19b of the second coil 19, the connecting portion 34a of the lead layer 34, and the connecting portion 35a of the lead layer 35. The insulating film 20 thus etched covers the top surfaces of the coils 13 and 19 except the two connecting portions 13a and 13b of the first coil 13 and the two connecting portions 19a and 19b of the second coil 19.

Next, a third coil 41 and the connecting layer 36 are formed by frame plating, for example. As shown in FIG. 27, the third coil 41 has two turns that are wound clockwise from an inner end to an outer end. The third coil 41 has a connecting portion 41a provided near the inner end thereof and a connecting portion 41b provided near the outer end thereof. The connecting portion 41a is connected to the connecting portion 13a of the first coil 13. The connecting portion 41b is connected to the connecting portion 19b of the second coil 19. In such a manner the third coil 41 connects the coil 13 to the coil 19 in series. The third coil 41 corresponds to the connecting layer of the invention.

As in the first embodiment, the connecting layer 36 connects the connecting portion 34a of the lead layer 34 to the connecting portion 13b of the first coil 13. The connecting layers 41 and 36 are made of a metal such as Cu and each have a thickness of 0.8 to 1.5 μm, for example.

Figures 21A, 21B:
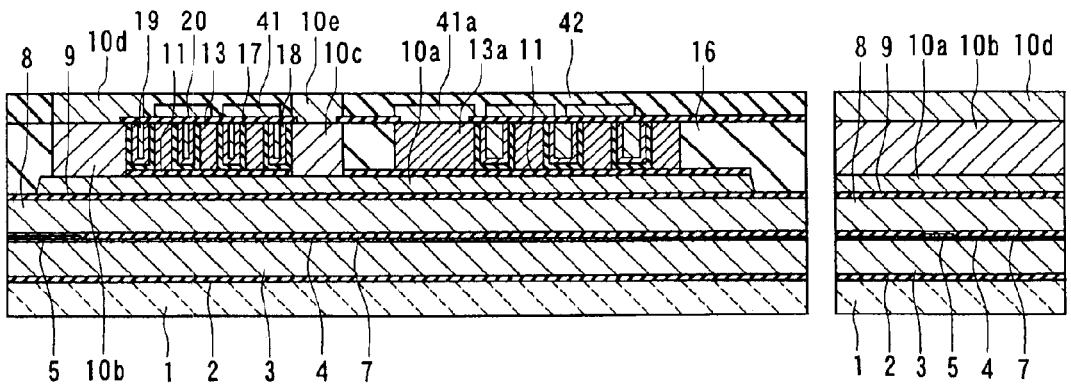
FIG. 21A and FIG. 21B are cross-sectional views for illustrating a step that follows FIG. 20A and FIG. 20B.

Next, as shown in FIG. 21A and FIG. 21B, the third layer 10d is formed on the second layer 10b, and the coupling layer 10e is formed on the coupling layer 10c each by frame plating, for example. The third layer 10d and the coupling layer 10e may be made of NiFe, CoNiFe or FeCo, for example. In the embodiment the third layer 10d and the coupling layer 10e are made of CoNiFe having a saturation flux density of 2.1 to 2.3 T by way of example. The third layer 10d and the coupling layer 10e each have a thickness of 1 to 2 μm, for example.

In the second embodiment the third layer 10d has a length orthogonal to the air bearing surface that is greater than the length of the second layer 10b orthogonal to the air bearing surface. The third layer 10d has a portion that is disposed to face at least one of part of the first coil 13 and part of the second coil 19, the insulating film 20 being disposed in between. The length of the third layer 10d orthogonal to the air bearing surface is preferably 1.0 to 3.0 μm, and 2.0 to 2.5 μm in the embodiment in particular.

Next, an insulating film 42 made of alumina, for example, and having a thickness of 2 to 3 μm is formed to cover the entire top surface of the layered structure. The insulating film 42 is then polished by CMP, for example. This polishing is performed such that the top surfaces of the third layer 10d, the coupling layer 10e, and the insulating film 42 are flattened and each of these layers has a thickness of 1.6 μm, for example. The insulating film 42 covers the connecting layers 41 and 36. The insulating film 42 corresponds to the fourth insulating film of the invention.

Next, as shown in FIG. 22A and FIG. 22B, a magnetic layer 43 made of a magnetic material and having a thickness of 0.3 to 0.7 μm is formed by sputtering, so as to cover the entire top surface of the layered structure. The magnetic layer 43 may be made of a high saturation flux density material such as CoFeN, FeAlN, FeN, FeCo, or FeZrN. In the embodiment the magnetic layer 43 is made of CoFeN having a saturation flux density of 2.4 T by way of example.

Next, on the magnetic layer 43, an etching mask 44a is formed in the portion corresponding to the third layer 10d, and an etching mask 44b is formed in the portion corresponding to the coupling layer 10e. Each of the etching masks 44a and 44b has an undercut so that the bottom surface is smaller than the top surface in order to facilitate lift-off that will be performed later. Such etching masks 44a and 44b may be formed by patterning a resist layer made up of two stacked organic films, for example.

FIG. 23A and FIG. 23B illustrate the following step. In the step the magnetic layer 43 is selectively etched by ion beam etching, for example, through the use of the etching masks 44a and 44b. The fourth layer 10f and the coupling layer 10g are thereby formed on the third layer 10d and the coupling layer 10e, respectively. The fourth layer 10f and the coupling layer 10g are made up of portions of the magnetic layer 43 remaining under the etching masks 44a and 44b after the etching. This etching is preferably performed such that an end face of the fourth layer 10f that is farther from the air bearing surface forms an angle in a range between 45 to 80 degrees inclusive with respect to the direction orthogonal to the top surface of the first layer 10a. The fourth layer 10f has a length orthogonal to the air bearing surface that is greater than the length of the second layer 10b orthogonal to the air bearing surface. The length of the fourth layer 10f is smaller than the length of the third layer 10d orthogonal to the air bearing surface.

Next, an insulating film 45 made of alumina, for example, is formed so as to cover the entire top surface of the layered structure. The etching masks 44a and 44b are then lifted off. Next, the insulating film 45 is polished by CMP, for example, so that the top surfaces of the fourth layer 10f, the coupling layer 10g and the insulating film 45 are flattened.

Next, as shown in FIG. 24A and FIG. 24B, an etching mask 46a is formed on the fourth layer 10f and an etching mask 46b is formed on the coupling layer 10g. Each of the etching masks 46a and 46b has an undercut so that the bottom surface is smaller than the top surface in order to facilitate lift-off that will be performed later. Such etching masks 46a and 46b may be formed by patterning a resist layer made up of two stacked organic films, for example.

Next, the fourth layer 10f and the insulating film 45 are etched only by 0.25 to 0.4 μm, for example, by ion beam etching, for example, using the etching masks 46a and 46b. Through this etching a first surface and a second surface that have different levels are formed on the top surface of the fourth layer 10f. The first surface is located closer to the air bearing surface while the second surface is located farther from the air bearing surface. The second surface is closer to the top surface of the third layer 10d than the first surface. The surface that couples the first surface to the second surface defines the throat height of the write head.

Next, an insulating film 47 made of alumina, for example, and having a thickness of 0.4 to 0.5 μm is formed so as to cover the entire top surface of the layered structure. The etching masks 46a and 46b are then lifted off. Next, the insulating film 47 is polished only by 0.03 to 0.05 μm by CMP, for example, so that the top surfaces of the fourth layer 10f, the coupling layer 10g and the insulating film 47 are flattened.

The coupling layers 10c, 10e and 10g constitute the coupling portion 33 for establishing magnetic coupling between the bottom pole layer 10 and the top pole layer.

Next, as shown in FIG. 25A and FIG. 25B, the recording gap layer 26 having a thickness of 0.08 to 0.1 μm is formed to cover the entire top surface of the layered structure. The recording gap layer 26 may be made of an insulating material such as alumina or a nonmagnetic metal material such as Ru, NiCu or NiB. Next, a portion of the recording gap layer 26 corresponding to the coupling layer 10g is selectively etched.

Next, a magnetic layer 30a made of a magnetic material and having a thickness of 0.2 to 0.6 μm is formed by sputtering, for example, so as to cover the entire top surface of the layered structure. The magnetic layer 30a serves as a seed layer of a magnetic layer that will be formed thereon. The magnetic layer 30a may be made of a high saturation flux density material such as CoFeN, FeAlN, FeN, FeCo or FeZrN. In the embodiment the magnetic layer 30a is made of CoFeN having a saturation flux density of 2.4 T by way of example.

Next, a magnetic layer 30b having a thickness of 3.0 to 3.5 μm, for example, is formed by frame plating, for example, on the magnetic layer 30a. The magnetic layer 30b may be made of NiFe, CoNiFe or FeCo. In the embodiment the magnetic layer 30b is made of NiFe having a saturation flux density of 2.1 to 2.3 T by way of example. The magnetic layer 30b is disposed to extend from a region corresponding to the fourth layer 10f of the bottom pole layer 10 to a region corresponding to the coupling layer 10g. The magnetic layer 30b has a shape corresponding to the shape of the top pole layer. The magnetic layer 30b has a portion for defining the track width.

Next, as shown in FIG. 26A and FIG. 26B, the magnetic layer 30a is selectively etched by reactive ion etching, for example, using the magnetic layer 30b as an etching mask. The top pole layer 30 is made up of the magnetic layer 30a thus etched and the magnetic layer 30b. As in the first embodiment, the top pole layer 30 includes the track width defining portion 30A and the yoke portion 30B.

Next, a portion of the recording gap layer 26 and a portion of the fourth layer 10f of the bottom pole layer 10 that are located around the track width defining portion 30A are etched by ion beam etching, for example, using the top pole layer 30 as a mask. A trim structure as shown in FIG. 26B is thereby formed.

Next, the overcoat layer 31 made of alumina, for example, and having a thickness of 20 to 40 μm is formed so as to cover the entire top surface of the layered structure. The surface of the overcoat layer 31 is flattened, and electrode pads (not shown) are formed thereon. Finally, the slider including the foregoing layers is lapped to form the air bearing surface 32. The thin-film magnetic head including the read and write heads is thus completed.

In the second embodiment the insulating film 42 covers the third coil 41. The third layer 10d and the insulating film 42 have (top) surfaces facing toward the top pole layer 30 that are flattened and located in one plane.

In the second embodiment the third coil 41 connects the coil 13 to the coil 19 in series. The third coil 41 has two turns disposed around the coupling portion 33. Therefore, the thin-film coil incorporating the first to third coils 13, 19 and 41 has nine turns. According to the second embodiment, the total number of turns of the thin-film coil is thus greater than that of the thin-film coil of the first embodiment, so that more lines of flux are generated by the thin-film coil. In is thereby possible to make the overwrite property still better, compared to the first embodiment.

In prior art the resistance of the thin-film coil is increased and the yoke length is increased if the number of turns of the thin-film coil is increased. According to the embodiment of the invention, in contrast, the third coil 41 is provided so that the number of turns of the coil is made greater without increasing the yoke length, compared to the case in which the third coil 41 is not provided. In addition, it is possible that the turns of the third coil 41 have a width greater than the width of the turns of each of the first and second coils 13 and 19. It is thereby possible to prevent an increase in resistance of the thin-film coil while the number of turns is increased.

According to the embodiment the third layer 10d has a portion facing toward at least one of part of the first coil 13 and part of the second coil 19, the insulating film 20 being disposed in between. As a result, it is possible to prevent the part of the first coil 13 or the part of the second coil 19 from being exposed when the portion of the fourth layer 10f around the track width defining portion 30A is etched by ion beam etching, for example, to form the trim structure.

To reduce the yoke length, it is preferred that the length of the second layer 10b orthogonal to the air bearing surface is small. Here, a case is considered wherein the second layer 10b is etched to form the trim structure while the third layer 10d and the fourth layer 10f are not provided. If the length of the second layer 10b orthogonal to the air bearing surface is small in this case, the volume of a portion of the second layer 10b near the recording gap layer 26 is reduced, and the magnetic flux may saturate halfway through the magnetic path. According to the embodiment of the invention, in contrast, the third and fourth layers 10d and 10f are disposed on the second layer 10b. In addition, the length of each of the third and fourth layers 10d and 10f that is orthogonal to the air bearing surface is greater than the length of the second layer 10b orthogonal to the air bearing surface. It is thereby possible to prevent the flux from saturating halfway through the magnetic path and to reduce the yoke length. As a result, the overwrite property is improved.

According to the embodiment, the first surface and the second surface that have different levels are formed on the top surface of the fourth layer 10f. The surface that couples the first surface to the second surface defines the throat height. Consequently, there is no great change in the thickness of the fourth layer 10f. It is thereby possible to prevent the flux from saturating halfway through the magnetic path. As a result, the overwrite property is improved.

Figure 28:
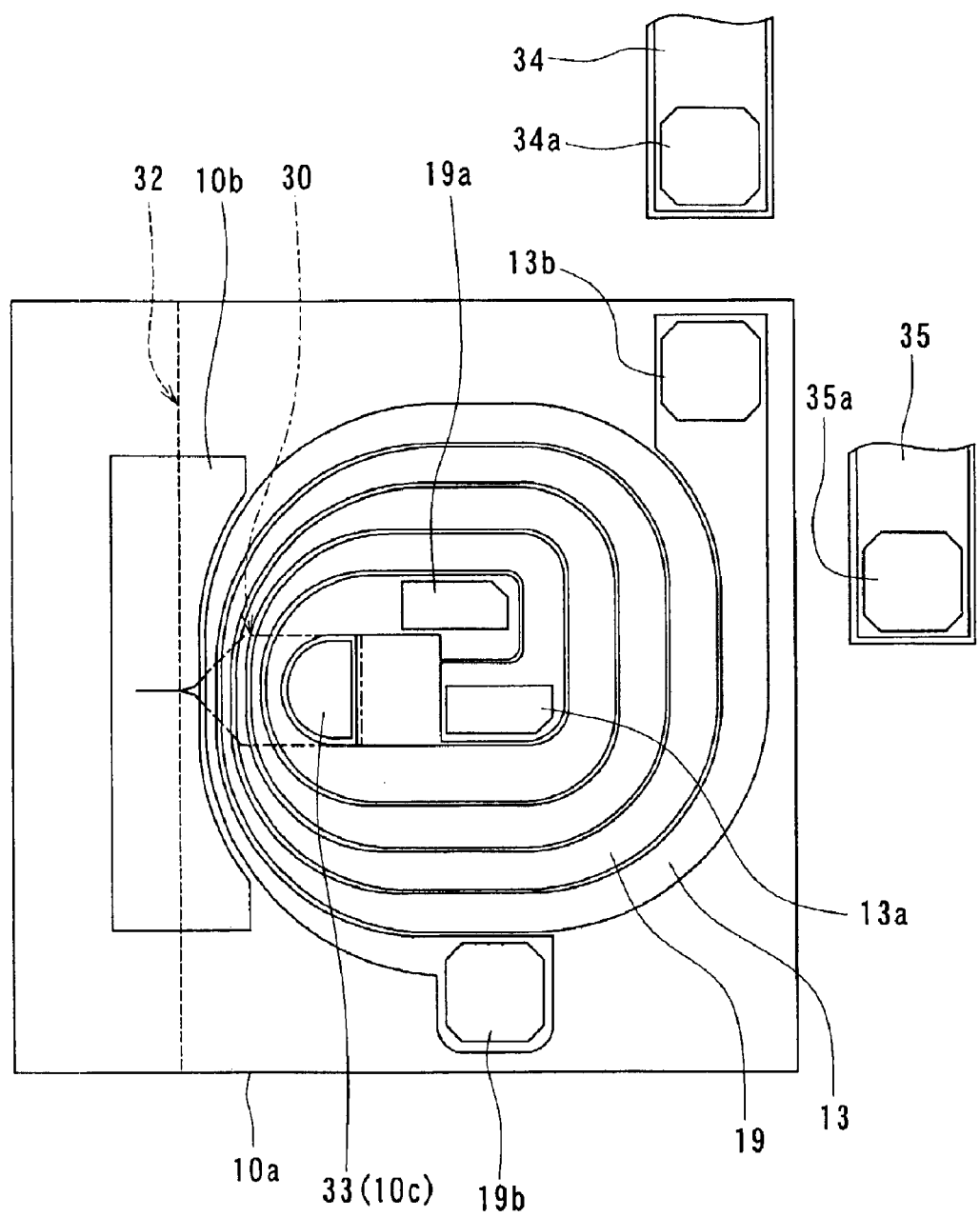
FIG. 28 is a plan view for illustrating the configurations and arrangement of a first coil and a second coil of a modification example of the second embodiment.
Figure 29:
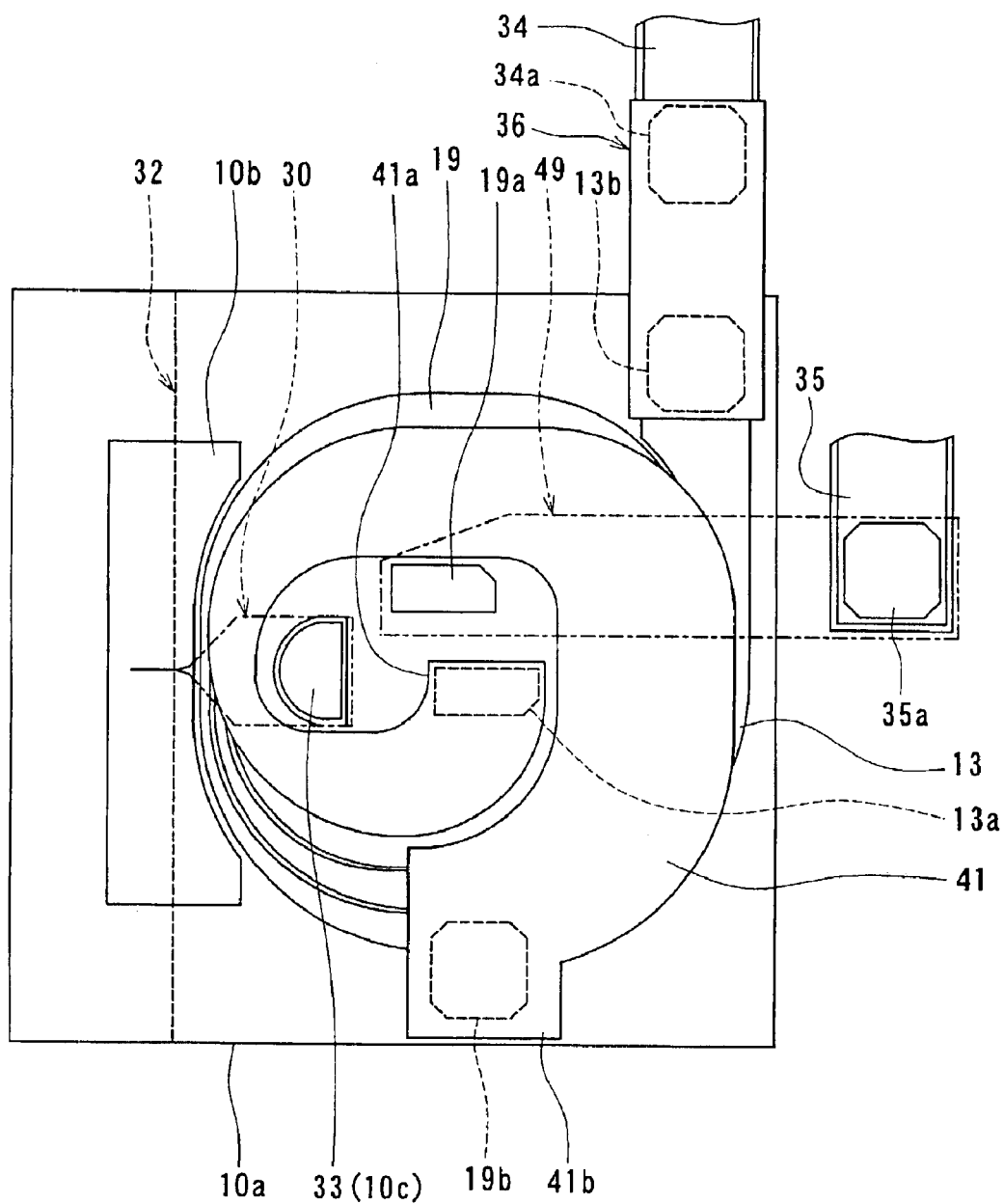
FIG. 29 is a plan view for illustrating the configuration and arrangement of a third coil of the modification example of the second embodiment.

Reference is now made to FIG. 28 and FIG. 29 to describe a modification example of the second embodiment. FIG. 28 is a plan view for illustrating the configurations and arrangement of the first coil and the second coil of the modification example. FIG. 29 is a plan view for illustrating the configuration and arrangement of the third coil of the modification example. In the modification example the total number of turns of the first coil 13 and the second coil 19 is five, as shown in FIG. 28. The number of turns of the third coil 41 is one, as shown in FIG. 29. Therefore, the thin-film coil incorporating the first to third coils 13, 19 and 41 has six turns. The remainder of configuration of the modification example is the same as the thin-film magnetic head described with reference to FIG. 20A to FIG. 26A, FIG. 20B to FIG. 26B, and FIG. 27.

The remainder of configuration, function and effects of the second embodiment are similar to those of the first embodiment.

[Third Embodiment]

Reference is now made to FIG. 30A to FIG. 39A, and FIG. 30B to FIG. 39B to describe a thin-film magnetic head and a method of manufacturing the same of a third embodiment of the invention. FIG. 30A to FIG. 39A are cross sections orthogonal to the air bearing surface and the top surface of a substrate. FIG. 30B to FIG. 39B are cross sections of magnetic pole portions each of which is parallel to the air bearing surface.

The method of manufacturing the thin-film magnetic head of the third embodiment includes the steps the same as those of the first embodiment that are performed until the magnetic layer 10ap is selectively etched, using the photoresist layer 14 as a mask, to complete the first layer 10a, as shown in FIG. 3A and FIG. 3B.

In the following step of the third embodiment the photoresist layer 14 is removed. Next, as shown in FIG. 30A and FIG. 30B, the insulating film 17 is formed to cover the entire top surface of the layered structure. The material, forming method and thickness of the insulating film 17 are the same as those of the first embodiment. Next, the electrode film 18 is formed to cover the entire top surface of the layered structure. The material, forming method and thickness of the electrode film 18 are the same as those of the first embodiment.

Next, as shown in FIG. 31A and FIG. 31B, the conductive layer 19p made of a metal such as Cu and having a thickness of 3 to 4 $\mu$m, for example, is formed by frame plating, for example, on the electrode film 18. The electrode film 18 and the conductive layer 19p are to be used for making the second coil 19.

Next, a portion of the electrode film 18 except the portion below the conductive layer 19p is removed by ion beam etching, for example. An insulting layer 51 made of alumina, for example, and having a thickness of 3 to 5 $\mu$m is then formed to cover the entire top surface of the layered structure.

Figures 32A, 32B:
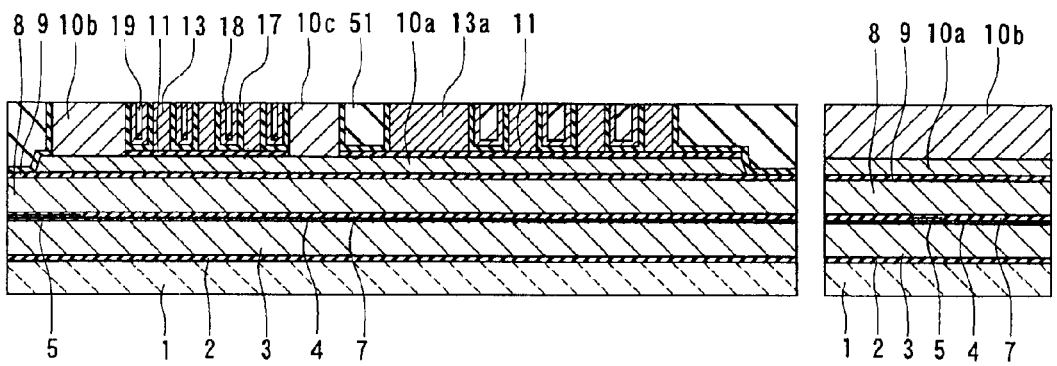
FIG. 32A and FIG. 32B are cross-sectional views for illustrating a step that follows FIG. 31A and FIG. 31B.

Next, as shown in FIG. 32A and FIG. 32B, the insulating layer 51 is polished by CMP, for example, so that the second layer 10b, the coupling layer 10c and the first coil 13 are exposed. The second coil 19 is thereby made up of portions of the conductive layer 19p and the electrode film 18 remaining between the second layer 10b and the first coil 13, between turns of the first coil 13, and between the coupling layer 10c and the first coil 13. This polishing is performed such that each of the second layer 10b, the coupling layer 10c, the first coil 13 and the second coil 19 has a thickness of 2.5 to 3.0 $\mu$m, for example. The first coil 13 and the second coil 19 have the shapes as shown in FIG. 18 that are the same as the first embodiment.

Figures 33A, 33B:
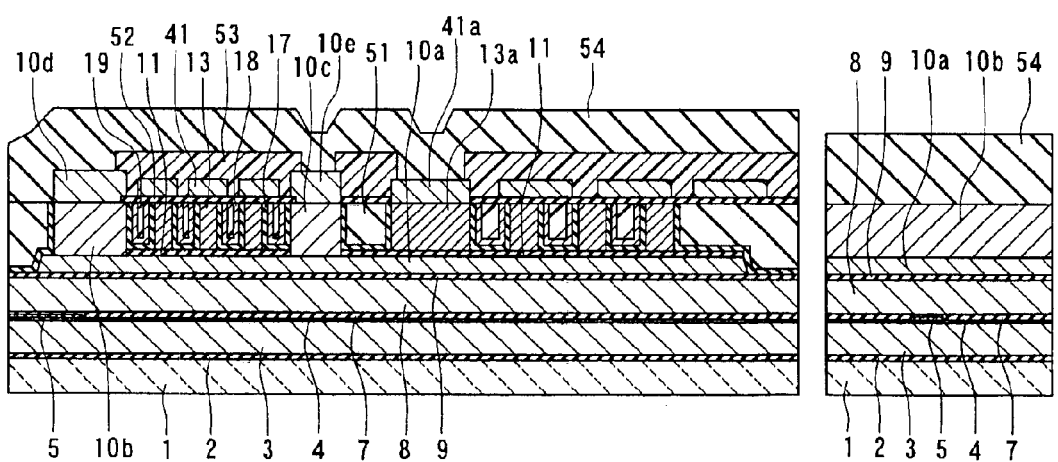
FIG. 33A and FIG. 33B are cross-sectional views for illustrating a step that follows FIG. 32A and FIG. 32B.

Next, as shown in FIG. 33A and FIG. 33B, an insulating film 52 made of alumina, for example, and having a thickness of 0.2 $\mu$m, for example, is formed to cover the entire top surface of the layered structure. Etching is selectively performed on the insulating film 52 in the portions corresponding to the second layer 10b, the coupling layer 10c, the two connecting portions 13a and 13b of the first coil 13, the two connecting portions 19a and 19b of the second coil 19, the connecting portion 34a of the lead layer 34, and the connecting portion 35a of the lead layer 35. The insulating film 52 thus etched covers the top surfaces of the coils 13 and 19 except the two connecting portions 13a and 13b of the first coil 13 and the two connecting portions 19a and 19b of the second coil 19.

Next, the third coil 41 and the connecting layer 36 are formed by frame plating, for example. (See FIG. 27.) In the third embodiment the third coil 41 has three turns that are wound clockwise from an inner end to an outer end. As in the second embodiment, the third coil 41 has the connecting portion 41a provided near the inner end thereof and the connecting portion 41b provided near the outer end thereof. The connecting portion 41a is connected to the connecting portion 13a of the first coil 13. The connecting portion 41b is connected to the connecting portion 19b of the second coil 19. In such a manner the third coil 41 connects the coil 13 to the coil 19 in series. The third coil 41 corresponds to the connecting layer of the invention.

As in the second embodiment, the connecting layer 36 connects the connecting portion 34a of the lead layer 34 to the connecting portion 13b of the first coil 13. The connecting layers 41 and 36 are made of a metal such as Cu and each have a thickness of 0.8 to 1.5 μm, for example.

Next, the third layer 10d is formed on the second layer 10b, and the coupling layer 10e is formed on the coupling layer 10c each by frame plating, for example. The third layer 10d and the coupling layer 10e may be made of NiFe, CoNiFe or FeCo, for example. In the embodiment the third layer 10d and the coupling layer 10e are made of CoNiFe having a saturation flux density of 2.1 to 2.3 T by way of example. The third layer 10d and the coupling layer 10e each have a thickness of 1 to 2 μm, for example. Next, an insulating film 53 made of a photoresist, for example, and having a thickness of 1 to 2 μm is formed to cover the third coil 41. An insulating film 54 made of alumina, for example, and having a thickness of 2 to 3 μm is formed to cover the entire top surface of the layered structure.

Figures 34A, 34B:
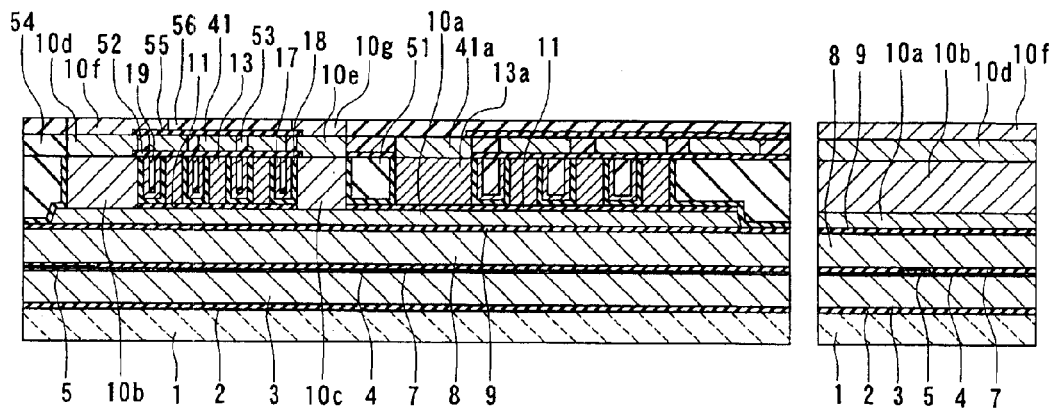
FIG. 34A and FIG. 34B are cross-sectional views for illustrating a step that follows FIG. 33A and FIG. 33B.

Next, as shown in FIG. 34A and FIG. 34B, the insulating film 54 is polished by CMP, for example, so that the third coil 41 is exposed. The top surfaces of the third layer 10d, the coupling layer 10e, the third coil 41, the insulating film 53 and the insulating film 54 are thereby flattened. The space between adjacent ones of turns of the third coil 41 is filled with the insulating film 53. The insulating film 53 corresponds to the fourth insulating film of the invention.

In the third embodiment the third layer 10d has a length orthogonal to the air bearing surface that is nearly equal to the length of the second layer 10b orthogonal to the air bearing surface.

Next, an insulating film 55 made of alumina, for example, and having a thickness of 0.2 μm, for example, is formed to cover the entire top surface of the layered structure. A portion of the insulating film 55 corresponding to the third layer 10d and a portion corresponding to the coupling layer 10e are selectively etched. The insulating film 55 thus etched covers the top surface of the third coil 41. The insulating film 55 corresponds to the fifth insulating film of the invention.

Next, the fourth layer 10f is formed on the third layer 10d, and the coupling layer 10g is formed on the coupling layer 10e each by frame plating, for example. The fourth layer 10f and the coupling layer 10g may be made of NiFe, CoNiFe or FeCo, for example. In the embodiment the fourth layer 10f and the coupling layer 10g are made of CoNiFe having a saturation flux density of 2.1 to 2.3 T by way of example. The fourth layer 10f and the coupling layer 10g each have a thickness of 1.0 μm, for example. Next, an insulating film 56 made of alumina, for example, and having a thickness of 1.5 μm, for example, is formed to cover the entire top surface of the layered structure. Next, the insulating film 56 is polished by CMP, for example, so that the fourth layer 10f and the coupling layer 10g are exposed and each have a thickness of 0.5 μm, for example. The top surfaces of the fourth layer 10f, the coupling layer 10g and the insulating film 56 are thereby flattened.

In the third embodiment the fourth layer 10f has a length orthogonal to the air bearing surface that is greater than the length of the second layer 10b orthogonal to the air bearing surface and the length of the third layer 10d orthogonal to the air bearing surface. The fourth layer 10f has a portion that is disposed to face toward part of the third coil 41, the insulating film 55 being disposed in between.

Next, although not shown, a magnetic layer made of a magnetic material and having a thickness of 0.3 to 0.7 μm is formed by sputtering, so as to cover the entire top surface of the layered structure. The magnetic layer may be made of a high saturation flux density material such as CoFeN, FeAlN, FeN, FeCo, or FeZrN. In the embodiment the magnetic layer is made of CoFeN having a saturation flux density of 2.4 T by way of example.

Figures 35A, 35B:
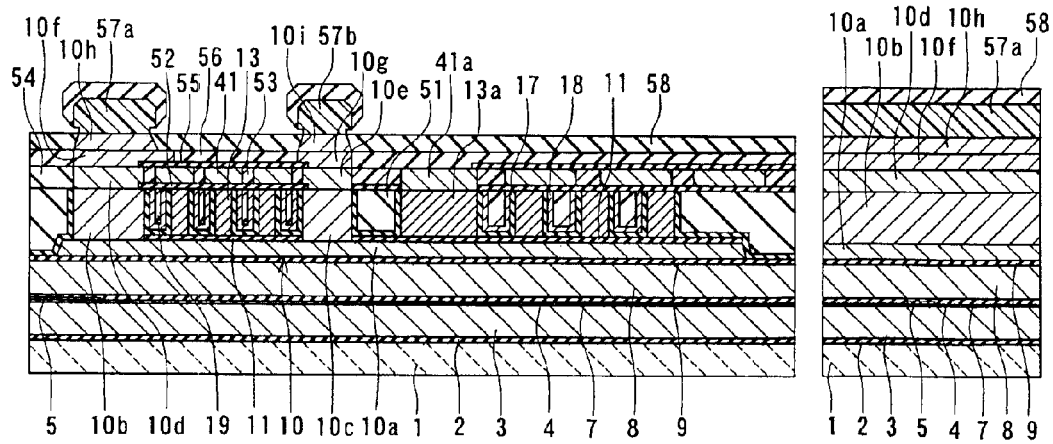
FIG. 35A and FIG. 35B are cross-sectional views for illustrating a step that follows FIG. 34A and FIG. 34B.

Next, as shown in FIG. 35A and FIG. 35B, on the above-mentioned magnetic layer, an etching mask 57a is formed in the portion corresponding to the fourth layer 10f, and an etching mask 57b is formed in the portion corresponding to the coupling layer 10g. Each of the etching masks 57a and 57b has an undercut so that the bottom surface is smaller than the top surface in order to facilitate lift-off that will be performed later. Such etching masks 57a and 57b may be formed by patterning a resist layer made up of two stacked organic films, for example.

Next, the above-mentioned magnetic layer is selectively etched by ion beam etching, for example, through the use of the etching masks 57a and 57b. The fifth layer 10h and the coupling layer 10i are thereby formed on the fourth layer 10f and the coupling layer 10g, respectively. The fifth layer 10h and the coupling layer 10i are made up of portions of the magnetic layer remaining under the etching masks 57a and 57b after the etching. This etching is preferably performed such that an end face of the fifth layer 10h that is farther from the air bearing surface forms an angle in a range between 45 and 80 degrees inclusive with respect to the direction orthogonal to the top surface of the first layer 10a. The fifth layer 10h has a length orthogonal to the air bearing surface that is greater than the length of the second layer 10b orthogonal to the air bearing surface. The length of the fifth layer 10h is smaller than the length of the fourth layer 10f orthogonal to the air bearing surface.

Next, an insulating film 58 made of alumina, for example, is formed so as to cover the entire top surface of the layered structure. The etching masks 57a and 57b are then lifted off. Next, the insulating film 58 is polished by CMP, for example, so that the top surfaces of the fifth layer 10h, the coupling layer 10i and the insulating film 58 are flattened.

Next, as shown in FIG. 36A and FIG. 36B, an etching mask 59a is formed on the fifth layer 10h and an etching mask 59b is formed on the coupling layer 10i. Each of the etching masks 59a and 59b has an undercut so that the bottom surface is smaller than the top surface in order to facilitate lift-off that will be performed later. Such etching masks 59a and 59b may be formed by patterning a resist layer made up of two stacked organic films, for example.

Next, the fifth layer 10h and the insulating film 58 are etched only by 0.25 to 0.4 μm, for example, by ion beam etching, for example, using the etching masks 59a and 59b. Through this etching a first surface and a second surface that have different levels are formed on the top surface of the fifth layer 10h. The first surface is located closer to the air bearing surface while the second surface is located farther from the air bearing surface. The second surface is closer to the top surface of the fourth layer 10f than the first surface. The surface that couples the first surface to the second surface defines the throat height of the write head.

Next, an insulating film 60 made of alumina, for example, and having a thickness of 0.4 to 0.5 μm is formed so as to cover the entire top surface of the layered structure. The etching masks 59a and 59b are then lifted off. Next, the insulating film 60 is polished only by 0.03 to 0.05 μm by CMP, for example, so that the top surfaces of the fifth layer 10*h*, the coupling layer 10*i* and the insulating film 60 are flattened.

The coupling layers 10*c*, 10*e*, 10*g* and 10*i* constitute the coupling portion 33 for establishing magnetic coupling between the bottom pole layer 10 and the top pole layer.

Next, as shown in FIG. 37A and FIG. 37B, the recording gap layer 26 having a thickness of 0.08 to 0.1 μm is formed to cover the entire top surface of the layered structure. The recording gap layer 26 may be made of an insulating material such as alumina or a nonmagnetic metal material such as Ru, NiCu or NiB. Next, a portion of the recording gap layer 26 corresponding to the coupling layer 10*i* is selectively etched.

Next, the magnetic layer 30*a* made of a magnetic material and having a thickness of 0.2 to 0.6 μm is formed by sputtering, for example, so as to cover the entire top surface of the layered structure. The magnetic layer 30*a* serves as a seed layer of a magnetic layer that will be formed thereon. The magnetic layer 30*a* may be made of a high saturation flux density material such as CoFeN, FeAlN, FeN, FeCo or FeZrN. In the embodiment the magnetic layer 30*a* is made of CoFeN having a saturation flux density of 2.4 T by way of example.

Figure 38A:
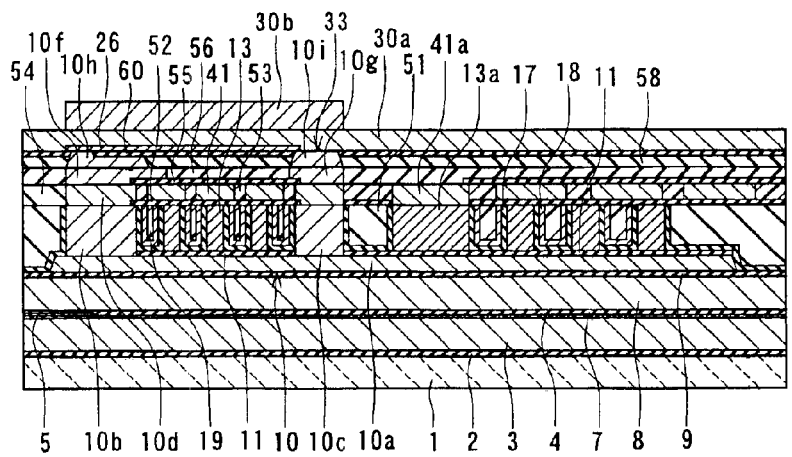
FIG. 38A and FIG. 38B are cross-sectional views for illustrating a step that follows FIG. 37A and FIG. 37B.
Figure 38B:
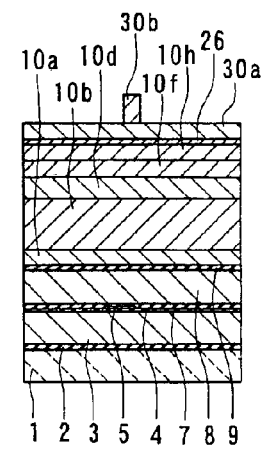

Next, as shown in FIG. 38A and FIG. 38B, the magnetic layer 30*b* having a thickness of 3.0 to 3.5 μm, for example, is formed by frame plating, for example, on the magnetic layer 30*a*. The magnetic layer 30*b* may be made of NiFe, CoNiFe or FeCo. In the embodiment the magnetic layer 30*b* is made of CoNiFe having a saturation flux density of 2.1 to 2.3 T by way of example. The magnetic layer 30*b* is disposed to extend from a region corresponding to the fifth layer 10*h* of the bottom pole layer 10 to a region corresponding to the coupling layer 10*i*. The magnetic layer 30*b* has a shape corresponding to the shape of the top pole layer. The magnetic layer 30*b* has a portion for defining the track width.

Figure 39A:
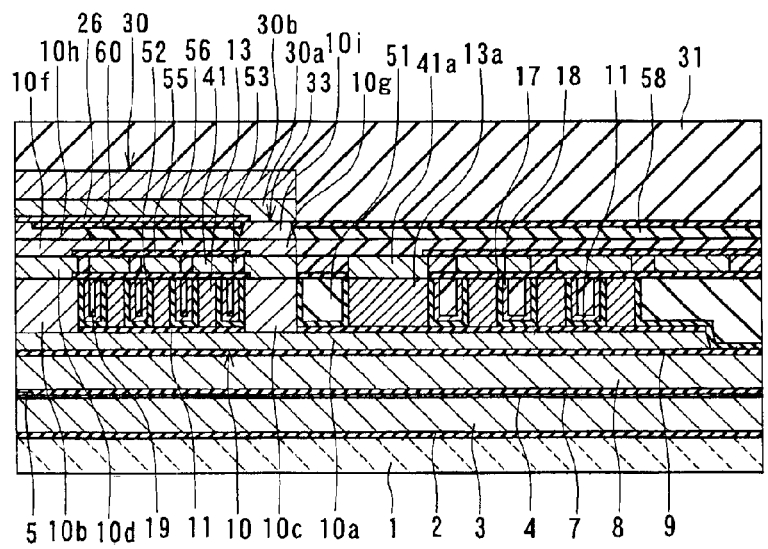
FIG. 39A and FIG. 39B are cross-sectional views for illustrating a step that follows FIG. 38A and FIG. 38B.
Figure 39B:
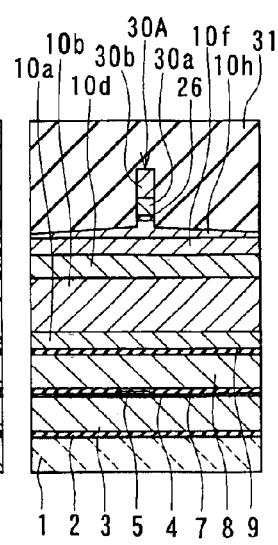

Next, as shown in FIG. 39A and FIG. 39B, the magnetic layer 30*a* is selectively etched by ion beam etching, for example, using the magnetic layer 30*b* as an etching mask. The top pole layer 30 is made up of the magnetic layer 30*a* thus etched and the magnetic layer 30*b*. As in the first embodiment, the top pole layer 30 includes the track width defining portion 30A and the yoke portion 30B.

Next, a portion of the recording gap layer 26 and a portion of the fifth layer 10*h* of the bottom pole layer 10 that are located around the track width defining portion 30A are etched by ion beam etching, for example, using the top pole layer 30 as a mask. A trim structure as shown in FIG. 39B is thereby formed.

Next, the overcoat layer 31 made of alumina, for example, and having a thickness of 20 to 40 μm is formed so as to cover the entire top surface of the layered structure. The surface of the overcoat layer 31 is flattened, and electrode pads (not shown) are formed thereon. Finally, the slider including the foregoing layers is lapped to form the air bearing surface 32. The thin-film magnetic head including the read and write heads is thus completed.

According to the third embodiment, the fourth layer 10*f* has a portion facing toward part of the third coil 41, the insulating film 55 being disposed in between. As a result, it is possible to prevent the part of the third coil 41 from being exposed when the portion of the fifth layer 10*h* around the track width defining portion 30A is etched by ion beam etching, for example, to form the trim structure.

The remainder of configuration, function and effects of the third embodiment are similar to those of the first or second embodiment.

The present invention is not limited to the foregoing embodiments but may be practiced in still other ways. For example, although the connecting layer that connects the first coil 13 to the second coil 19 in series is made up of a single layer in the embodiments, the connecting layer may be made up of a plurality of layers. In this case, at least the lowest layer of the layers making up the connecting layer that is in contact with the coils 13 and 19 is preferably made of a metal such as Cu. The layers except the lowest layer may be made of a magnetic metal material. The layers except the lowest layer may also be made of a material the same as that of the top pole layer and formed at the same time as the top pole layer.

The invention is also applicable to a thin-film magnetic head dedicated to writing that has an induction-type electromagnetic transducer only, or a thin-film magnetic head that performs writing and reading with an induction-type electromagnetic transducer.

According to the thin-film magnetic head of the invention and the method of manufacturing the same, as thus described, the first pole layer incorporates: the first layer disposed to face toward the thin-film coil; the second layer disposed near the medium facing surface and connected to the first layer in such a manner that the second layer protrudes closer toward the second pole layer than the first layer; and the third layer disposed near the medium facing surface and connected to the second layer in such a manner that the third layer protrudes closer toward the second pole layer than the second layer. In addition, the thin-film coil incorporates: the first coil having turns part of which is disposed between the second layer and the coupling portion; the second coil having turns at least part of which is disposed between the turns of the first coil; and the connecting layer disposed on a side of the third layer and connecting the first coil to the second coil in series. As a result, the invention achieves the thin-film magnetic head having a reduced track width that enhance the writing density, having a reduced magnetic path length that results in excellent writing characteristics in a high frequency band, and having the thin-film coil with a low resistance.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   a first pole layer and a second pole layer that include magnetic pole portions opposed to each other and located in regions of the pole layers on a side of the medium facing surface;
   a coupling portion located away from the medium facing surface, and including at least one of a portion of the first pole layer and a portion of the second pole layer, and magnetically coupling the first pole layer to the second pole layer;
   a gap layer provided between the pole portion of the first pole layer and the pole portion of the second pole layer; and
   a thin-film coil disposed around the coupling portion, at least part of the coil being disposed between the first and second pole layers and insulated from the first and second pole layers, wherein:
   the first pole layer incorporates: a first layer disposed to face toward the thin-film coil; a second layer disposed near the medium facing surface and connected to the first layer in such a manner that the second layer protrudes closer toward the second pole layer than the first layer; and a third layer disposed near the medium facing surface and connected to the second layer in such a manner that the third layer protrudes closer toward the second pole layer than the second layer;

the thin-film coil incorporates: a first coil having turns part of which is disposed between the second layer and the coupling portion; a second coil having turns at least part of which is disposed between the turns of the first coil; and a connecting layer disposed on a side of the third layer and connecting the first coil to the second coil in series; and the thin-film magnetic head further comprises: a first insulating film disposed between the first layer and the first and second coils; a second insulating film disposed between the turns of the first coil and the turns of the second coil; a third insulating film disposed between the connecting layer and the first and second coils; and a fourth insulating film disposed around the connecting layer.

2. The thin-film magnetic head according to claim 1, wherein each of the first coil, the second coil and the connecting layer is made of a metal.

3. The thin-film magnetic head according to claim 1, wherein each of the first coil, the second coil and the connecting layer is made of copper.

4. The thin-film magnetic head according to claim 1, wherein the second layer, the first coil and the second coil have surfaces facing toward the second pole layer, the surfaces being located in one plane.

5. The thin-film magnetic head according to claim 1, wherein the third layer, the connecting layer and the fourth insulating film have surfaces facing toward the second pole layer, the surfaces being located in one plane.

6. The thin-film magnetic head according to claim 1, wherein the fourth insulating film covers the connecting layer, and wherein the third layer and the fourth insulating film have surfaces facing toward the second pole layer, the surfaces being located in one plane.

7. The thin-film magnetic head according to claim 1, wherein the connecting layer has turns disposed around the coupling portion.

8. The thin-film magnetic head according to claim 1, wherein the first pole layer further incorporates a fourth layer defining a throat height, the fourth layer being connected to the third layer in such a manner that the fourth layer protrudes closer toward the second pole layer than the third layer.

9. The thin-film magnetic head according to claim 8, wherein the third layer has a portion disposed to face toward at least one of part of the first coil and part of the second coil, the third insulating film being disposed in between.

10. The thin-film magnetic head according to claim 1, wherein the first pole layer further incorporates: a fourth layer connected to the third layer in such a manner that the fourth layer protrudes closer toward the second pole layer than the third layer; and a fifth layer defining a throat height, the fifth layer being connected to the fourth layer in such a manner that the fifth layer protrudes closer toward the second pole layer than the fourth layer.

11. The thin-film magnetic head according to claim 10, wherein the connecting layer has turns disposed around the coupling portion.

12. The thin-film magnetic head according to claim 11, further comprising a fifth insulating film covering a surface of the connecting layer facing toward the second pole layer, wherein the fourth layer has a portion disposed to face toward part of the connecting layer, the fifth insulating film being disposed in between.

13. The thin-film magnetic head according to claim 1, wherein the connecting layer has a thickness smaller than a thickness of each of the first coil and the second coil.

14. The thin-film magnetic head according to claim 1, wherein the second pole layer is a flat layer.

15. A method of manufacturing a thin-film magnetic head, the head comprising:

a medium facing surface that faces toward a recording medium;

a first pole layer and a second pole layer that include magnetic pole portions opposed to each other and located in regions of the pole layers on a side of the medium facing surface;

a coupling portion located away from the medium facing surface, and including at least one of a portion of the first pole layer and a portion of the second pole layer, and magnetically coupling the first pole layer to the second pole layer;

a gap layer provided between the pole portion of the first pole layer and the pole portion of the second pole layer; and a thin-film coil disposed around the coupling portion, at least part of the coil being disposed between the first and second pole layers and insulated from the first and second pole layers, wherein:

the first pole layer incorporates: a first layer disposed to face toward the thin-film coil; a second layer disposed near the medium facing surface and connected to the first layer in such a manner that the second layer protrudes closer toward the second pole layer than the first layer; and a third layer disposed near the medium facing surface and connected to the second layer in such a manner that the third layer protrudes closer toward the second pole layer than the second layer; and the thin-film coil incorporates: a first coil having turns part of which is disposed between the second layer and the coupling portion; a second coil having turns at least part of which is disposed between the turns of the first coil; and a connecting layer disposed on a side of the third layer and connecting the first coil to the second coil in series, the method comprising the steps of:

forming the first layer;

forming a first insulating film on the first layer;

forming the first coil on the first insulating film;

forming the second layer and the coupling portion on the first layer;

forming a second insulating film on sidewalls of the turns of the first coil;

forming the second coil in such a manner that only the second insulating film is provided between the turns of the first coil and the turns of the second coil;

forming a third insulating film to cover the first and second coils;

forming the connecting layer on the third insulating film;

forming the third layer on the second layer;

forming a fourth insulating film around the connecting layer;

forming the gap layer on the pole portion of the first pole layer; and forming the second pole layer on the gap layer.

16. The method according to claim 15, wherein each of the first coil, the second coil and the connecting layer is made of a metal.

17. The method according to claim 15, wherein each of the first coil, the second coil and the connecting layer is made of copper.

18. The method according to claim 15, further comprising the step of flattening top surfaces of the second layer, the first coil and the second coil after the second layer, the first coil and the second coil are formed.

19. The method according to claim 15, further comprising the step of flattening top surfaces of the third layer, the connecting layer and the fourth insulating film after the third layer, the connecting layer and the fourth insulating film are formed.

20. The method according to claim 15, wherein:
the fourth insulating film is formed to cover the connecting layer; and
the method further comprises the step of flattening top surfaces of the third layer and the fourth insulating film after the third layer and the fourth insulating film are formed.

21. The method according to claim 15, wherein the connecting layer is formed to have turns disposed around the coupling portion.

22. The method according to claim 15, wherein:
the first pole layer is formed to further incorporate a fourth layer defining a throat height, the fourth layer being connected to the third layer in such a manner that the fourth layer protrudes closer toward the second pole layer than the third layer; and
the method further comprises the step of forming the fourth layer on the third layer.

23. The method according to claim 22, wherein the third layer is formed to have a portion disposed to face toward at least one of part of the first coil and part of the second coil, the third insulating film being disposed in between.

24. The method according to claim 15, wherein:
the first pole layer is formed to further incorporate: a fourth layer connected to the third layer in such a manner that the fourth layer protrudes closer toward the second pole layer than the third layer; and a fifth layer defining a throat height, the fifth layer being connected to the fourth layer in such a manner that the fifth layer protrudes closer toward the second pole layer than the fourth layer; and
the method further comprises the step of forming the fourth layer on the third layer, and the step of forming the fifth layer on the fourth layer.

25. The method according to claim 24, wherein the connecting layer is formed to have turns disposed around the coupling portion.

26. The method according to claim 25, further comprising the step of forming a fifth insulating film covering a top surface of the connecting layer, wherein
the fourth layer is formed to have a portion disposed to face toward part of the connecting layer, the fifth insulating film being disposed in between.

27. The method according to claim 15, wherein the connecting layer is formed to have a thickness smaller than a thickness of each of the first coil and the second coil.

28. The method according to claim 15, wherein the second pole layer is made flat.

29. The method according to claim 15, wherein the second insulating film is formed by stacking a plurality of alumina films made through chemical vapor deposition.

* * * * *